(12) United States Patent
Robell

(10) Patent No.: US 11,678,614 B2
(45) Date of Patent: Jun. 20, 2023

(54) SYSTEM FOR FERTIGATION OF PLANT VESSELS

(71) Applicant: Maui Greens, Inc., Kula, HI (US)

(72) Inventor: Kevin Robell, Kula, HI (US)

(73) Assignee: Maui Greens, Inc., Kula, HI (US)

( * ) Notice: Subject to any disclaimer, the term of this patent is extended or adjusted under 35 U.S.C. 154(b) by 0 days.

(21) Appl. No.: 17/576,689

(22) Filed: Jan. 14, 2022

(65) Prior Publication Data

US 2022/0225578 A1    Jul. 21, 2022

Related U.S. Application Data

(60) Provisional application No. 63/252,525, filed on Oct. 5, 2021, provisional application No. 63/252,533, filed
(Continued)

(51) Int. Cl.
*A01G 9/029* (2018.01)
*A01G 27/00* (2006.01)
(Continued)

(52) U.S. Cl.
CPC .......... *A01G 9/0297* (2018.02); *A01C 23/042* (2013.01); *A01G 7/045* (2013.01);
(Continued)

(58) Field of Classification Search
CPC .... A01G 9/0297; A01G 9/0299; A01G 9/249; A01G 7/045; A01G 9/023; A01G 9/247;
(Continued)

(56) References Cited

U.S. PATENT DOCUMENTS

| | | | |
|---|---|---|---|
| 4,505,068 | A | 3/1985 | Kaneko |
| 5,022,182 | A | 6/1991 | Anderson |

(Continued)

FOREIGN PATENT DOCUMENTS

| | | |
|---|---|---|
| CN | 203646206 U | 6/2014 |
| CN | 111937731 A | 11/2020 |

(Continued)

OTHER PUBLICATIONS

U.S. Appl. No. 63/138,389, filed Jan. 15, 2021, Kevin Robell.
(Continued)

*Primary Examiner* — Monica L Perry
*Assistant Examiner* — Aaron M Rodziwicz
(74) *Attorney, Agent, or Firm* — Rowan Tels LLC; Robert Auerbach; Charles Mirho

(57) ABSTRACT

A system for the fertigation of a plant vessel and method of use for the same is disclosed. The system comprises a grow module containing a plurality of growing trays additionally containing plants, and/or shoots of plants in various stages of development. The growing trays are individually extracted from the grow module via a tray movement system and tray elevator controlled by a control system and precisely placed in a fertigation system, wherein they are aligned over and lowered onto an at least one nozzle which penetrate the plant vessels containing the plants and fertigate them with a combination of water, nutrients, and/or pressurized air. The individual growing tray is then replaced in the grow module and the process is repeated for all growing trays and plant vessels in the grow module.

20 Claims, 15 Drawing Sheets

Related U.S. Application Data on Oct. 5, 2021, provisional application No. 63/236,512, filed on Aug. 24, 2021, provisional application No. 63/138,391, filed on Jan. 15, 2021, provisional application No. 63/138,389, filed on Jan. 15, 2021.

(51) Int. Cl.

| | | |
|---|---|---|
| *A01C 23/04* | (2006.01) | |
| *A01G 7/04* | (2006.01) | |
| *A01G 9/24* | (2006.01) | |
| *H05B 45/10* | (2020.01) | |
| *H05B 47/105* | (2020.01) | |
| *A01G 9/02* | (2018.01) | |
| *A01G 29/00* | (2006.01) | |

(52) U.S. Cl.
CPC ........... *A01G 9/023* (2013.01); *A01G 9/0299* (2018.02); *A01G 9/247* (2013.01); *A01G 9/249* (2019.05); *A01G 27/003* (2013.01); *A01G 29/00* (2013.01); *H05B 45/10* (2020.01); *H05B 47/105* (2020.01)

(58) Field of Classification Search
CPC .... A01G 27/003; A01G 29/00; A01C 23/042; H05B 45/10; H05B 47/105
See application file for complete search history.

(56) References Cited

U.S. PATENT DOCUMENTS

| | | | |
|---|---|---|---|
| 5,212,904 | A | 5/1993 | Green et al. |
| 6,973,885 | B2 | 12/2005 | Fulgham |
| 11,483,988 | B2* | 11/2022 | Bertram ................. A01G 9/022 |
| 2004/0049974 | A1 | 3/2004 | Poirier et al. |
| 2008/0110088 | A1 | 5/2008 | Brusatore |
| 2012/0060416 | A1 | 3/2012 | Brusatore |
| 2012/0124904 | A1 | 5/2012 | Marchildon |
| 2012/0218750 | A1 | 8/2012 | Klase et al. |
| 2012/0324788 | A1 | 12/2012 | Sakura et al. |
| 2013/0127329 | A1 | 5/2013 | Komada et al. |
| 2014/0366443 | A1 | 12/2014 | Brusatore |
| 2015/0027049 | A1 | 1/2015 | Bijl et al. |
| 2015/0223418 | A1 | 8/2015 | Collins et al. |
| 2016/0295820 | A1* | 10/2016 | Aykroyd ................ A01G 9/249 |
| 2017/0099791 | A1* | 4/2017 | Joseph .................. A01G 22/25 |
| 2017/0135290 | A1 | 5/2017 | Sahni et al. |
| 2018/0035625 | A1 | 2/2018 | Lindbo et al. |
| 2018/0235156 | A1* | 8/2018 | Blair .................... A01G 27/003 |
| 2018/0359938 | A1 | 12/2018 | Millar et al. |
| 2019/0133063 | A1* | 5/2019 | Bateman ................ A01G 7/045 |
| 2019/0159415 | A1* | 5/2019 | Bertram ................. A01G 9/20 |
| 2019/0191517 | A1 | 6/2019 | Adams et al. |
| 2019/0246571 | A1 | 8/2019 | Ingram-Tedd et al. |
| 2019/0380283 | A1 | 12/2019 | Chong |
| 2020/0214228 | A1* | 7/2020 | Cho ......................... A01G 9/18 |
| 2020/0229357 | A1* | 7/2020 | Spiro ........................ A01G 7/00 |
| 2020/0236883 | A1* | 7/2020 | Ambrosi ................. A01G 9/143 |
| 2020/0260673 | A1* | 8/2020 | Travaglini ............ A01G 31/06 |
| 2020/0281129 | A1* | 9/2020 | Anderson ............ A01G 9/0297 |
| 2020/0367455 | A1 | 11/2020 | Vesty |
| 2020/0383277 | A1* | 12/2020 | Tyink ................... A01G 27/008 |
| 2021/0259160 | A1 | 8/2021 | Marder-Eppstein et al. |

FOREIGN PATENT DOCUMENTS

| | | |
|---|---|---|
| WO | 2018208686 A1 | 11/2018 |
| WO | 2019025317 A1 | 2/2019 |
| WO | 2019074549 A1 | 4/2019 |
| WO | 2020018993 A1 | 1/2020 |
| WO | 2021055257 A1 | 3/2021 |

OTHER PUBLICATIONS

U.S. Appl. No. 63/236,512, filed Aug. 24, 2021, Kevin Robell.
U.S. Appl. No. 63/252,525, filed Oct. 5, 2021, Kevin Robell.
U.S. Appl. No. 63/252,533, filed Oct. 5, 2021, Kevin Robell.
PCT/US 22/12466_PCT_International Search Report and Written Opinion_06272022.
PCT/US2022/012451 International Search Report, dated Mar. 29, 2022 entire document.
PCT/US2022/012451 Written Opinion of the International Searching Authority, dated Mar. 29, 2022 entire document.
PCT/US2022/012483 International Search Report, dated Apr. 1, 2022 entire document.
PCT/US2022/012483 Written Opinion of the International Searching Authority, dated Apr. 1, 2022.
PCT/US2022/012547 International Search Report, dated Mar. 29, 2022 entire document.
PCT/US2022/012547 Written Opinion of the International Search Report, dated Mar. 29, 2022 entire document.
PCT/US2022/012574 International Search Report. dated Mar. 29, 2022 entire document.
PCT/US2022/012574 Written Opinion of the International Searching Authority, dated Mar. 29, 2022 entire document.

* cited by examiner

SYSTEM FOR FERTIGATION OF PLANT VESSELS

CROSS-REFERENCE TO RELATED APPLICATIONS

This application claims the benefit of U.S. Provisional Patent Application No. 63/252,525, filed Oct. 5, 2021, the benefit of U.S. Provisional Patent Application No. 63/252,533, filed on Oct. 5, 2021, the benefit of U.S. Provisional Patent Application No. 63/236,512, filed on Aug. 24, 2021, the benefit of U.S. Provisional Patent Application No. 63/138,391, filed on Jan. 15, 2021, and the benefit of U.S. Provisional Patent Application No. 63/138,389, filed on Jan. 15, 2021, each of which is incorporated herein by reference in its entirety.

BACKGROUND

The inherent difficulties of growing, maintaining, and shipping large individual quantities of edible plant matter are sufficiently extensive that the field doesn't have a particularly strong record of innovation. Mistakes at any point in the growing, maintaining, and/or shipping process(es) often instantly lead to unusable products, with no possibility of recovery or regeneration. In short, the methods and apparatus for growing, maintaining, and shipping large individual quantities of edible plant matter impose requirements of precision wholly unknown in most other industries. Each individual stage for the methods and apparatus imposes its own separate challenges.

Existing fertigation systems encounter several challenges when attempting to fertigate a large quantity of plants, each plant or group of plants at differing growth stages—from seeds or seedlings to shoots to plants—and thereby requiring differing quantities of water, nutrients, air, and so on. "Fertigation system" in this disclosure refers to a system used to inject fertilizers and nutrients, used for soil amendments, water amendments and other water-soluble products into an irrigation system. The fertigation system may also inject water, gases, and/or nutrients into plant vessels.

"Plant" in this disclosure refers to a living organism of the kind exemplified by trees, shrubs, herbs, grasses, ferns, and mosses, typically growing in a permanent site, absorbing water and inorganic substances through its roots, and synthesizing nutrients in its leaves by photosynthesis. "Seed" in this disclosure refers to a flowering plant's unit of reproduction, capable of developing into another such plant. "Seedling" in this disclosure refers to a young plant, especially one raised from seed and not from a cutting. "Shoots of plants" in this disclosure refers to new growth from seed germination that grows upward and where leaves will develop. Shoots may also refer to stems including their appendages, the leaves and lateral buds, flowering stems and flower buds.

Plants grow at differing rates and need a combination of customized liquid, solid and gaseous nutrients if they are to reach their full growth potential. Plants growing in large collections need monitoring at all growth stages, not least to adjust their fertigation needs as they mature. Individual plants, regardless of the scale at which they are grown and maintained, also need more than soil, water, light, and nutrients, though all four are important. The locations of these components and the timing schedule at which they are delivered to a growing plant are additionally key for plant growth.

Existing vessels for growing individual plants in large quantities exhibit several obstacles to successfully delivering packaged edible products. These obstacles include effectively delivering water and nutrients to the plants and controlling the climate conditions around the plant given the potential interactions between the plant and the growing medium as well as the interaction of the growing medium with the surroundings within the microclimate. Additional obstacles include protection against harsh handling when the plants are distributed, evaporation, effective watering of the growing medium, etc.

A need therefore exists for both a method and system for controlling, storing, feeding, efficiently growing, monitoring and delivering individually secured and maintained edible plant products.

BRIEF SUMMARY

The disclosure describes a fertigation system for a plurality of plant vessels.

In one aspect, a method of growing plants, seeds or seedlings, includes using a fertigation system to extract a growing tray holding plant vessels from a grow module. The fertigation system includes a tray movement system for extracting the growing tray from the grow module and placing the growing tray back into the grow module, a tray elevator for lowering and raising the growing tray, a first pump in fluid communication with at least one of a fresh water supply and a nutrient/water mixture, and a nozzle manifold in fluid communication with at least one of the first pump, the fresh water supply, and the nutrient/water mixture. The nozzle manifold includes a manifold header, and at least one nozzle in fluid communication with the manifold header, where the at least one nozzle is configured to inject at least one of the fresh water supply and the nutrient/water mixture supplied by the first pump into plant vessels on the growing tray. The plant vessels include plants, seeds or seedlings, and a substrate in a root zone. The method also includes moving the growing tray toward the at least one nozzle or moving the at least one nozzle toward the growing tray. The method also includes injecting at least one of the fresh water supply and the nutrient/water mixture into the root zone. The method also includes removing the at least one nozzle from the plant vessel. The method also includes placing the growing tray back into the grow module.

In one aspect, a plant fertigation system includes a tray movement system for extracting a growing tray from a grow module and placing the growing tray back into the grow module, a tray elevator for lowering and raising the growing tray, a first pump in fluid communication with at least one of a fresh water supply and a nutrient/water mixture, and a nozzle manifold in fluid communication with at least one of the first pump, the fresh water supply, and the nutrient/water mixture, the nozzle manifold includes a manifold header, and an at least one nozzle in fluid communication with the manifold header, where the at least one nozzle is configured to inject at least one of the fresh water supply and the nutrient/water mixture supplied by the first pump into plant vessels on the growing tray, the plant vessels including plants, seeds or seedlings, and a substrate in a root zone.

In one aspect, a plant growing system includes a plurality of plant vessels, the plant vessels including plants, seeds or seedlings, and a substrate in a root zone. The plant growing system also includes a growing tray configured to hold the plurality of the plant vessels. The plant growing system also includes a fertigation system as disclosed above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
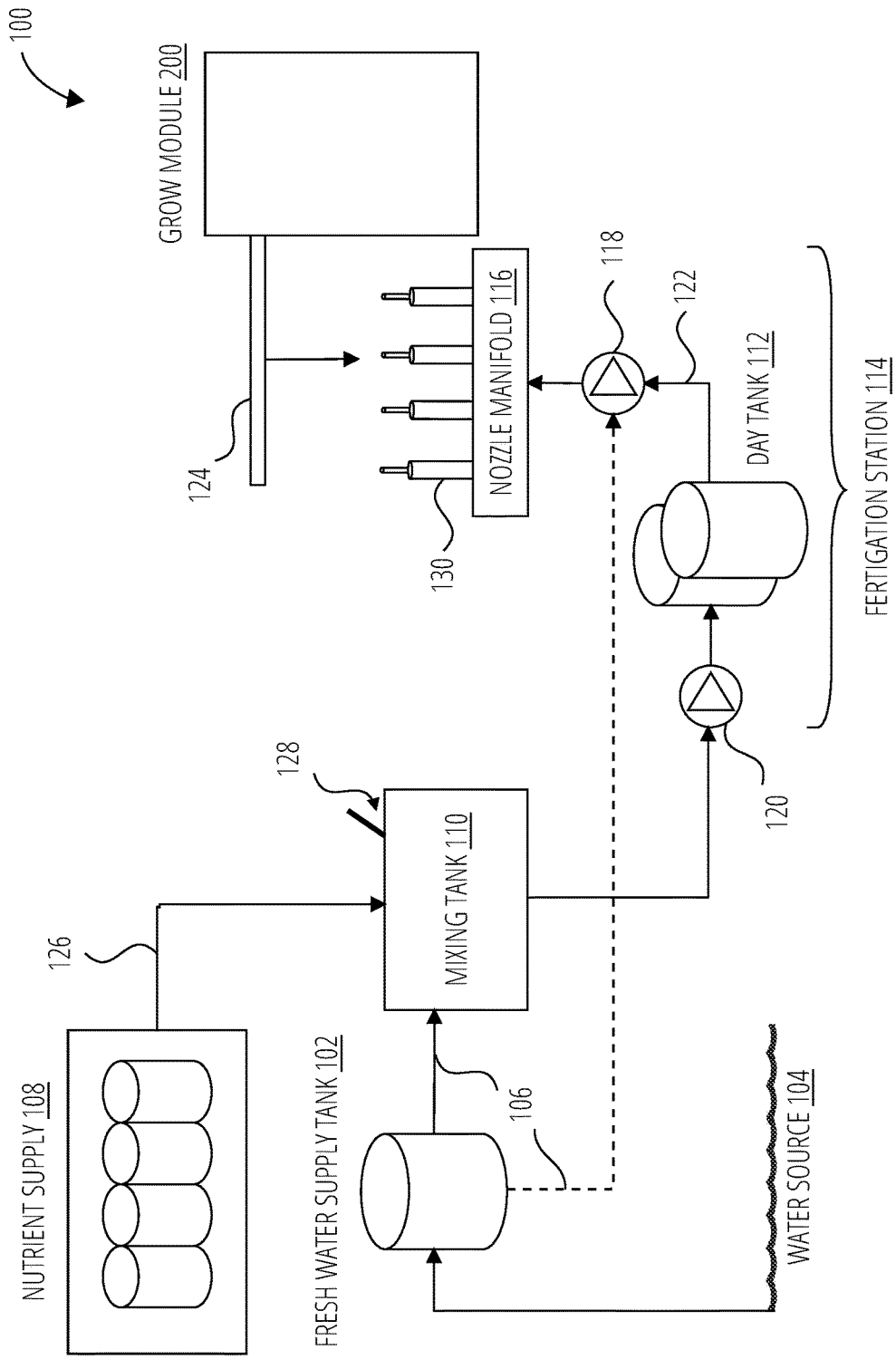
FIG. 1 illustrates a fertigation system 100 in accordance with one embodiment.

This disclosure is directed to a fertigation system for a plurality of plant vessels.

The successful fertigation of packaged edible products in a systematized manner presents a number of challenges. Fertigating specific individual plants, seeds or seedlings would be optimal as they grow and mature at different rates and often need individual attention—but such attention may be burdensome and impractical for the number of plants typically contained in a system of packaged edible products. Monitoring the growth of individual plants, or even small collections, may also be preferable to inspecting (visually or otherwise) a large group. Controlling the precise combination of water, nutrients, and air needed for a small collection of plants effectively loses its ability to customize delivery of said elements when that small collection scales up to hundreds or thousands of plants.

Existing fertigation systems take a "broad brush" approach to these challenges. Plants are fertigated on a large scale, with little attention paid to the growth needs of individual, or a small collection of, plants. Fertigation control follows this uniform approach, with some plants receiving a larger or smaller quantity of water, nutrients, and/or air than they might otherwise need at a specific growth stage simply because the growth needs of plants in nearby proximity are different. Growth monitoring necessarily scales up as well, with evaluation of plant maturation systematically ignoring outliers.

The identified problems and their solutions for a fertigation system are related to the storing, feeding and growing a scalable number of plants. Plants may be fertigated individually or at least in small groups. The delivery of water, nutrients, air and/or other elements may be customized and injected directly into plant vessels specifically designed to receive said delivery. Monitoring the growth process for individual plants may leverage the latest innovations in visual imagery capture and processing.

Existing vessels for growing individual plants in large quantities also exhibit several obstacles to the successful delivery of packaged edible products. The location of nutrients (e.g., fertilizing matter to feed the plant supplementing access to soil, water and air) may be effectively sealed from the plant itself, as direct exposure to raw nutrients inhibits its growth. Water may be carefully and precisely fed to said nutrients, with an additional means for the water and nutrients to reach the substrate in which the plant roots grow. The vessels may be effectively standardized in shape and composition to allow predictable delivery as described. And finally, the entire vessel may be compostable, as re-use of the vessel may not be otherwise feasible given other constraints.

The identified problems and their solutions for a plant vessel in the fertigation system are related to the storing, feeding and growing a scalable number of plants. First, providing a permeable separation between a deposit of plant nutrients and an area where seeds are initially planted allows for precise amounts of said nutrients to be delivered to a plant or set of plants. Also, calibrating the amounts of water and nutrients needed by a scalable number of plants, keeping the plant shoots and nutrients physically separated, and providing a system that delivers water to plant nutrients, and an area where seeds are initially planted, or some combination thereof based on plant type and fertigation need, is provided by this disclosure. Additionally, configuring an end-to-end system for supplying the fertigation system with water and nutrients and controlling same for a scalable number of plants in a grow module has solutions provided below.

The vessel containing the plants using such a method and apparatus utilizes two chambers, containing nutrients and substrate respectively, with a pervious membrane separation allowing water to transfer from one to the other. The vessel includes a means for water to be injected into its nutrient chamber in precisely measured quantities. "Nutrient chamber" in this disclosure refers to a stratified layer within an impervious outer vessel containing nutrients for plant fertigation purposes. The nutrient chamber may be formed between a cover and a pervious membrane. The plant itself may be effectively shielded from the raw nutrients. The entire vessel may be a standardized shape to fit into a grow module tray for a growing plant to be held in position for water, air and light delivery. Additionally, the vessel may be biodegradable and/or compostable.

Referring to FIG. 1, a fertigation system 100 is illustrated. Embodiments of the system comprise a fresh water supply tank 102, which having drawn water from a water source 104, retains a fresh water supply. Said fresh water supply 106 may feed a mixing tank 110, or a fresh water supply 106 may feed directly to the nozzle manifold 116 through a first pump 118. The mixing tank 110 receives the fresh water supply 106 from the fresh water supply tank 102 and nutrients 126 from a nutrient supply 108. The mixture of fresh water to nutrients, and the type and amount of nutrients, mixed in the mixing tank 110 depends on the type(s) of plants, seeds or seedlings, and/or shoots of plants being supplied with fresh water and the nutrient supply 108 in the fertigation system 100. A nutrient/water mixture 122 from the mixing tank 110 may be fed by a second pump 120 to a day tank 112. The first pump 118 may direct the nutrient/water mixture 122 in the mixing tank 110 to the nozzle manifold 116. The first pump 118 may provide pressure to inject the fresh water supply 106 or nutrient/water mixture 122 into plant vessels within the growing tray 124 for fertigation through at least one nozzle 130 of the nozzle manifold 116.

Fresh Water Supply Tank

"Water" in this disclosure refers to H₂O. The water may be freshwater, grey (i.e., reclaimed) water, or may include dissolved nutrients and/or minerals. "Fresh water supply" in this disclosure refers to a source of non-saline water that may be used by plants. The fresh water supply tank 102 comprises a container well known to those skilled in the art for retaining a fresh water supply for a fertigation system. Its size may be variable, from as small as 8 gallons (30 liters) to many times this capacity, depending on particular system needs—particularly as the source for both the mixing tank 110 and a direct water feed to the nozzle manifold 116. The tank may be typically made from insulated steel or temperature resistant plastic and include connecting piping to the mixing tank 110 and/or nozzle manifold 116 and first pump 118.

Mixing Tank

"Mixing tank" in this disclosure refers to a container designed to combine at least two substances, one of said substances typically liquid. In a fertigation system, a mixing tank may combine a fresh water supply and nutrient supply in precisely calculated amounts designed for the fertigation of plants. The mixing tank 110 comprises a container designed to combine a fresh water supply and nutrient supply in precisely calculated amounts designed for the eventual fertigation of the plants, seeds or seedlings, and/or shoots of plants in the system. The mixing tank 110, like the fresh water supply tank 102, may be of varying size depending on system need and also includes features such as translucency to ensure proper mixing in addition to supply measurement. Sources to the mixing tank may include the fresh water supply from the fresh water supply tank 102 and nutrients from the nutrient supply 108, each measured and controlled by input and shut-off valves. A drain valve may be included for emptying the tank as needed. The mixing tank may also include an opening for accepting non-liquid additives 128, such as fertilizers or nutrients in the form of a powder.

Nutrient Supply

"Nutrient supply" in this disclosure refers to fertilizers, nutrient additives, mineral supplements, beneficial commensal microorganisms, and the like, to optimize the growth conditions of plants when mixed with water. The nutrient supply 108 including the nutrients may comprise fertilizers, nutrient additives, mineral supplements, beneficial commensal microorganisms, and the like, to optimize the growth conditions of plants, seeds or seedlings, and/or shoots of plants once mixed with water and pumped to the nozzle manifold 116. Additionally, if so desired, the nutrient supply 108 may also comprise effective amounts of pesticides, selective herbicides, fungicides or other chemicals to remove, reduce, or prevent growth of parasites, weeds, pathogens, or any other detrimental organisms. The formulation of nutrient recipes for the nutrient supply 108 may be adjusted as appropriate for the variety of the plant produced and shipped.

Once a suitable nutrient/water mixture 122 created from water from the fresh water supply tank 102 and nutrients or other agents from the nutrients in the nutrient supply 108 is reached, the nutrient/water mixture 122 is pumped by a second pump 120 to a day tank 112. The day tank 112 retains the nutrient/water mixture and, as per its name, feeds the mixture to the nozzle manifold 116 on a daily basis. The water/nutrient mixture in the day tank 112 is pumped to the nozzle manifold 116 by utilizing a first pump 118, so named as the first pump in the fertigation system 100.

First Pump

"First pump" in this disclosure refers to a mechanical device using suction or pressure to raise or move liquids. The first pump 118 may be a standard fluid pump known to those skilled in the art using pressure for transferring liquids between tanks in a fertigation system 100 or from one tank to an outlet source like a nozzle manifold 116 or other container. The first pump 118 may be electric-powered or use an alternate energy source (e.g., natural gas or propane) to create the needed pressure. The first pump 118 may also have a suitable range of pressure (pounds per square inch, PSI) variability, e.g., from 5 to 90 PSI and flow range, e.g., from 10 to 2000 liters/hour to accommodate the flow between the day tank 112 and the nozzle manifold 116. In some embodiments, the first pump is a peristaltic pump.

Second Pump

"Second pump" in this disclosure refers to a mechanical device using suction or pressure to raise or move liquids. The second pump 120 may be a standard fluid pump known to those skilled in the art using pressure for transferring liquids between tanks in a fertigation system 100 or from one tank to an outlet source like a nozzle or other container. The second pump 120 may be electric-powered or use an alternate energy source (e.g., natural gas or propane) to create the needed pressure. The second pump 120 may have a suitable range of pressure (pounds per square inch, PSI) variability, e.g., from 5 to 90 PSI and flow range, e.g., from 10 to 2000 liters/hour to accommodate the flow between the mixing tank 110 and day tank 112. In some embodiments, the second pump is a peristaltic pump.

Day Tank

"Day tank" in this disclosure refers to a non-reactive container for storing fluids to be used on a periodic, e.g., daily basis. For a fertigation system, a day tank may contain a time-limited supply of water and/or nutrients previously mixed in a mixing tank. The day tank 112, as indicated by its name, contains a time-limited supply of fluid for the fertigation system 100. Owing to the changing nature of its fluid supplies, and the customized nature of the delivery of same to the plants, seeds or seedlings, and/or shoots of plants, the fertigation system 100 may not store its mixture of water and nutrient supply 108 for longer than a day or so. The means of shutting off the supply from the mixing tank 110 may be an input valve, utilized in synchronized fashion with the second pump 120. The drain valve in the mixing tank 110 may remove excess liquids unneeded by the day tank 112 under particular conditions. Like the fresh water supply tank 102 described above, the day tank 112 may be typically made from insulated steel or temperature resistant plastic, though like the mixing tank 110 it may in one embodiment be translucent to ensure proper mixing and a visual means of measuring supply. It may, like the fresh water supply tank 102 and mixing tank 110, be of varying size depending on system need.

Nozzle Manifold

"Nozzle manifold" in this disclosure refers to a device or chamber capable of delivering liquid and/or gas substances, and branching into at least one nozzle. The nozzle manifold 116 comprises piping or tubing for transporting liquids or pressurized air to an at least one nozzle extending from this component. "Pressurized air" in this disclosure refers to a gas, or a combination of gases, put under greater pressure than the air in the general environment. Pressurized air may include air containing a typical mixture of elements found in the atmosphere, as well as highly concentrated oxygen, ozone, or nitrogen, or some specific combination of these elements in desired concentrations differing from atmospheric air.

In one embodiment the nozzle manifold 116 may be cylindrical in shape with the at least one nozzle extending from the top circular surface through a manifold header. In another embodiment the nozzle manifold 116 may be in the form of an elongated tube with the at least one nozzle extending from the side (e.g., curved portion) of said elongated tube. The nozzle manifold 116 utilizing an at least one nozzle may be in various shapes, configurations, and sizes suitable to puncture plant vessels situated in grow racks extracted from the grow module 200 and placed in the fertigation system 100. The methods by which nozzles fertigate individual plants, seeds or seedlings, and/or shoots of plants with fresh water and nutrients are discussed in detail later in this disclosure.

Fertigation Station

A fertigation station 114 may be a location where plants undergo fertigation through the action of the components described above. In one embodiment, the fertigation station 114 may comprise the day tank 112, the first pump 118, the second pump 120, and the nozzle manifold 116. Grow modules 200 may be brought to the fertigation station 114, and their growing trays 204 removed so that plants in the growing tray 204 may be fertigated. This process is described in greater detail in subsequent sections.

Grow Module

"Grow module" in this disclosure refers to a storage medium for a plurality of growing trays to be extracted and inserted by the fertigation system. "Growing tray" in this disclosure refers to a plane of solid material sufficiently rigid in composition, e.g., tempered metal or plastic, to hold a plurality of plant vessels without bending or warping. In some embodiments, the shape of the growing tray is square or rectangular. The growing tray may be configured with cutouts to accommodate tray inserts for holding plant vessels, or to accommodate rigid plant vessel not needing rigid tray insert supports. The grow module 200 is a storage medium for a plurality of growing trays to be extracted and inserted by the fertigation system 100. The grow module 200 may be made of any metal, plastic, or other solid material of sufficient strength to hold the requisite number of growing trays and withstand repeated interaction with the tray movement system. In one embodiment the grow module 200 includes protruding shelves from the sides of its vertically oriented sides for the purpose of holding a plurality of growing trays and/or grow racks. In one embodiment the grow module 200 contains non-removable shelves fixed at pre-determined vertical locations within the grow module 200 and containing lighting and an accompanying power supply for said lighting and other electrical components. The lighting in this case may be provided by light emitting diodes (LED) or other lighting source known to those skilled in the art to facilitate plant growth. The grow module 200 may also include a source of air for the plants, and/or shoots of plants growing in the grow racks within through a plurality of fans fixed to the back of the module and powered by the power supply in the aforementioned non-removeable shelves. "Fan" in this disclosure refers to one or more devices capable of moving air currents at a fixed or variable rate. In one embodiment the operation of said fans may vary according to their location, e.g., air may be supplied to a subset of the plants in growing trays within the grow module 200. In one embodiment, the number of growing trays in a grow module 200 may also vary according to the growth stage of the various plants, and/or shoots of plants in the grow racks and growing trays within the grow module 200.

Figure 2A:
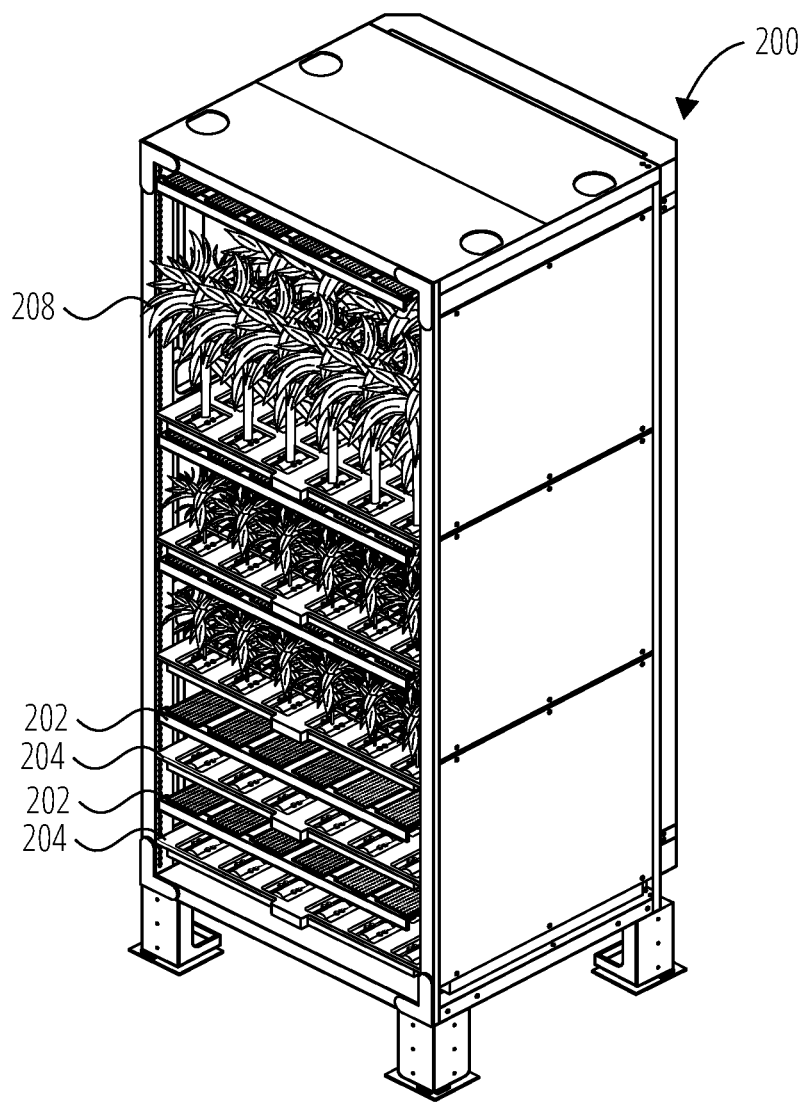
FIG. 2A and FIG. 2B illustrate a grow module 200 in accordance with one embodiment.
Figure 2B:
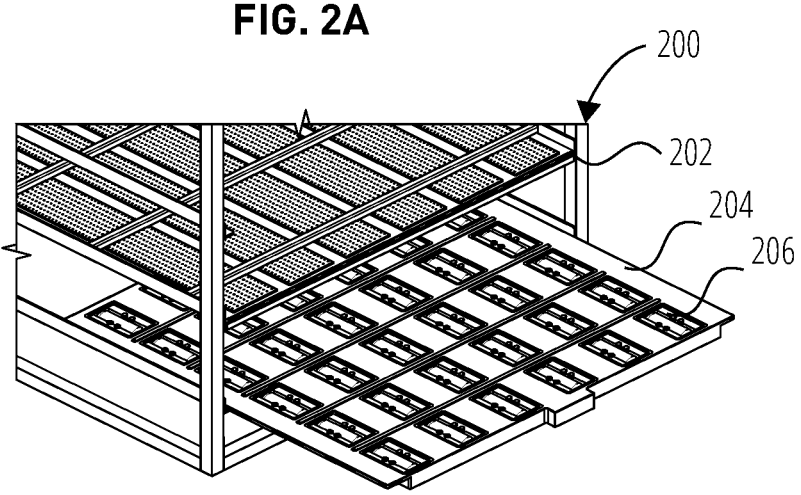

FIG. 2A and FIG. 2B illustrate a grow module 200 in accordance with one embodiment. The grow module 200 may include a plurality of growing trays 204 containing plant vessels 206, in which seeds, seedlings, shoots of plants, and/or plants 208 in various stages of development may be grown. Arranged above each growing tray 204 may be a light tray 202. The light trays 202 may provide light to growing plants within the grow module 200.

FIG. 2B illustrates in more detail a light tray 202 and a growing tray 204 holding plant vessels 206 within a grow module 200. The light tray 202 and growing tray 204 may be adjustably mounted using attachment and support hardware within the grow module 200, allowing flexible spacing of elements within the grow module 200, as is well understood in the art. This allows plants at different stages of growth to be accommodated within a single grow module 200, and further allows lighting to be provided from a light tray 202 at a variable height above each growing tray 204 in order to optimally light each plant within the growing tray 204.

Figure 3:
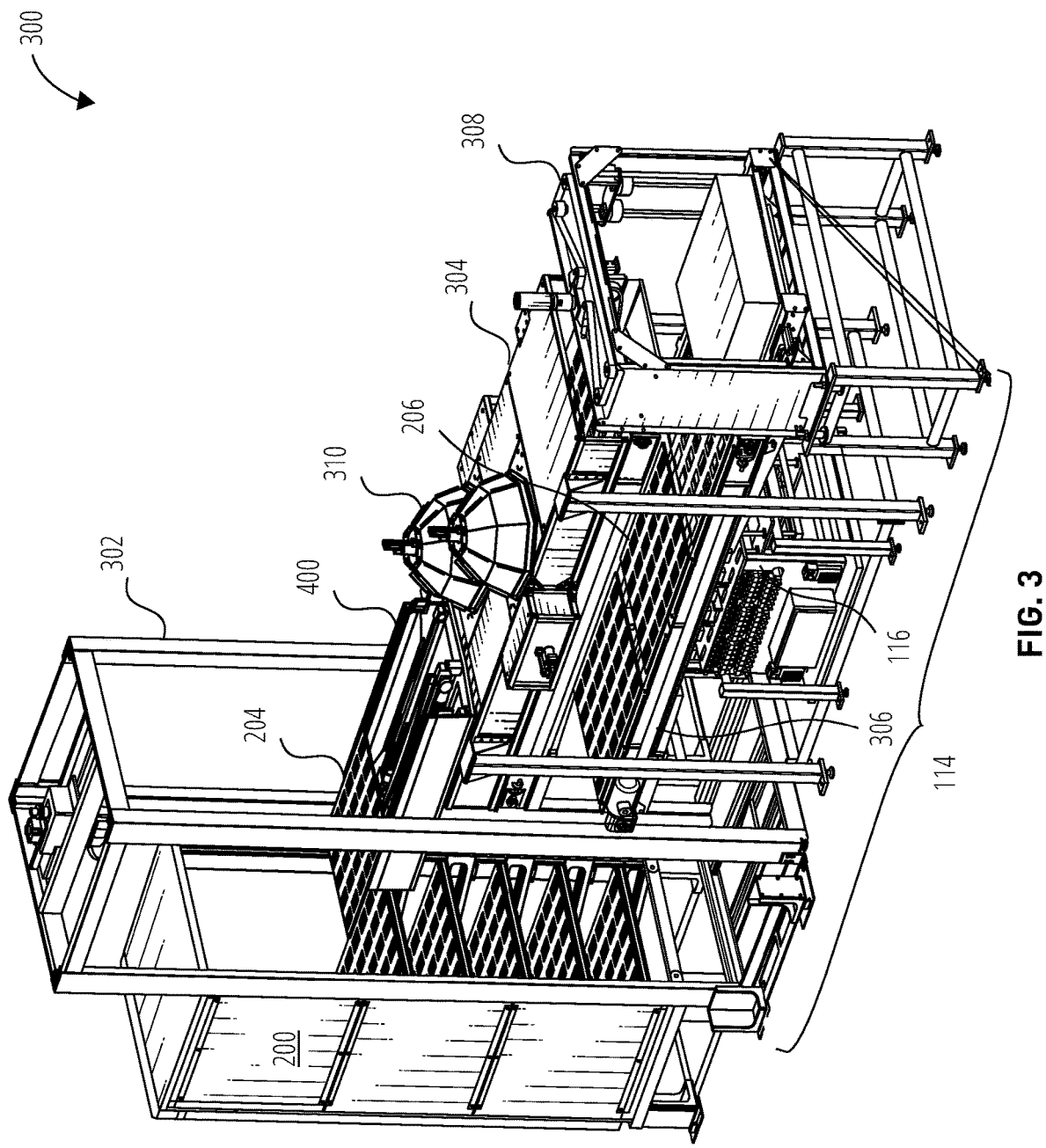
FIG. 3 illustrates a grow module and fertigation station 300 in accordance with one embodiment.

Referring to FIG. 3, a grow module and fertigation station 300 is illustrated. In one embodiment, a grow module 200 may contain a plurality of growing trays, each tray holding a plurality of plant vessels containing seeds, seedlings, shoots of plants, and/or plants in various stages of development. The grow module 200 may contain a variable number of growing trays, configured according to the fertigation needs of the individual plants, seeds or seedlings, and/or shoots of plants, each plant vessel 206 contained within the growing tray 204.

As shown, a growing tray 204 may be extracted from the grow module 200 via a tray movement system 400, an automated or manual system for sliding a growing tray 204 from the grow module 200 for fertigation purposes. The tray movement system 400 may then position the growing tray 204 onto an upper conveyor 304. The upper conveyor 304 may carry the growing tray 204 to an imaging station 310, as is described in greater detail with respect to FIG. 8. The upper conveyor 304 may further transport the growing tray 204 to a tray elevator 308, which may lower the tray to the level of a lower conveyor 306.

The lower conveyor 306 may position the growing tray 204 above the nozzle manifold 116 of the fertigation station 114. The nozzle manifold 116 may be configured such that the at least one nozzle 130 is aligned with plant vessels 206 contained within the growing tray 204. The number and type of the at least one nozzle 130 may be configured to correspond with the plant vessel configuration in each growing tray 204, as well as with the mixture of fresh water supply and nutrient supply pumped by the first pump to the nozzle manifold 116. This may be customized based on the specific fertigation needs of the individual seeds, seedlings, shoots of plants, and/or plants contained therein.

Tray Elevator

The tray elevator 308 comprises a drive system powered by a motor for the purpose of raising and lowering growing trays, one at a time, growing trays between an upper conveyor 304 and a lower conveyor 306. Said drive system may be of any type such as, but not limited to, a belt drive, a chain drive, a direct drive, etc. The motor, under control of the control system, may power the drive mechanism to pull the growing tray 204 to its proper vertical position.

Tray Movement System

Figure 4A:
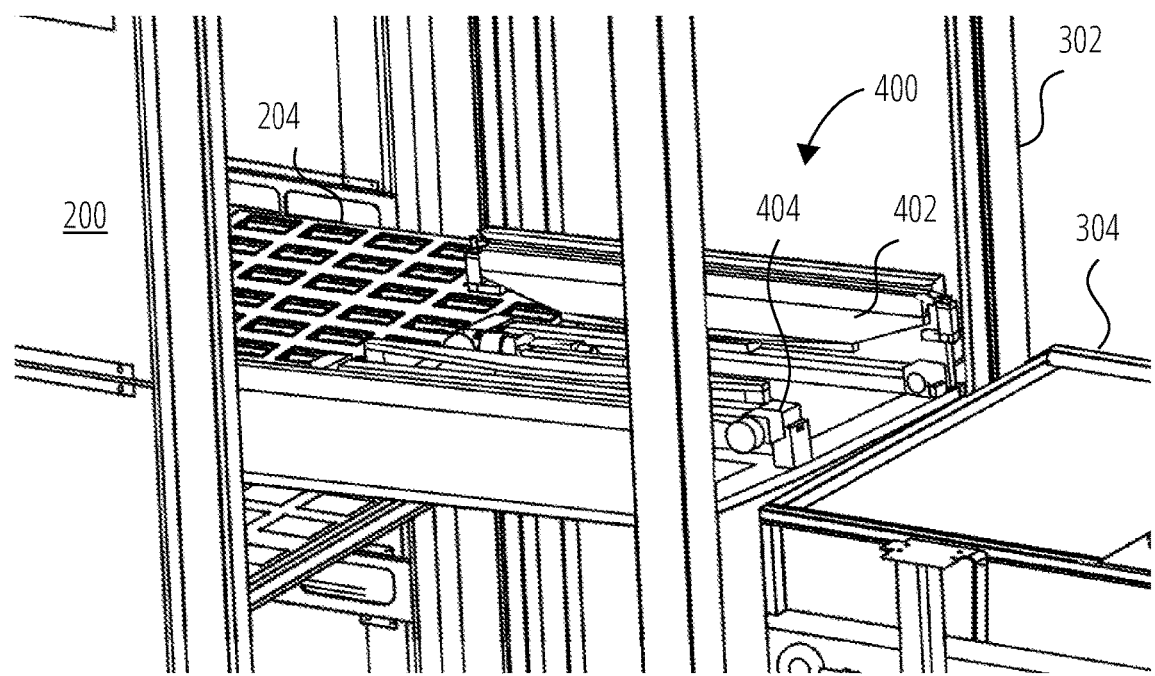
FIG. 4A illustrates a tray movement system 400 in accordance with one embodiment.
Figure 4B:
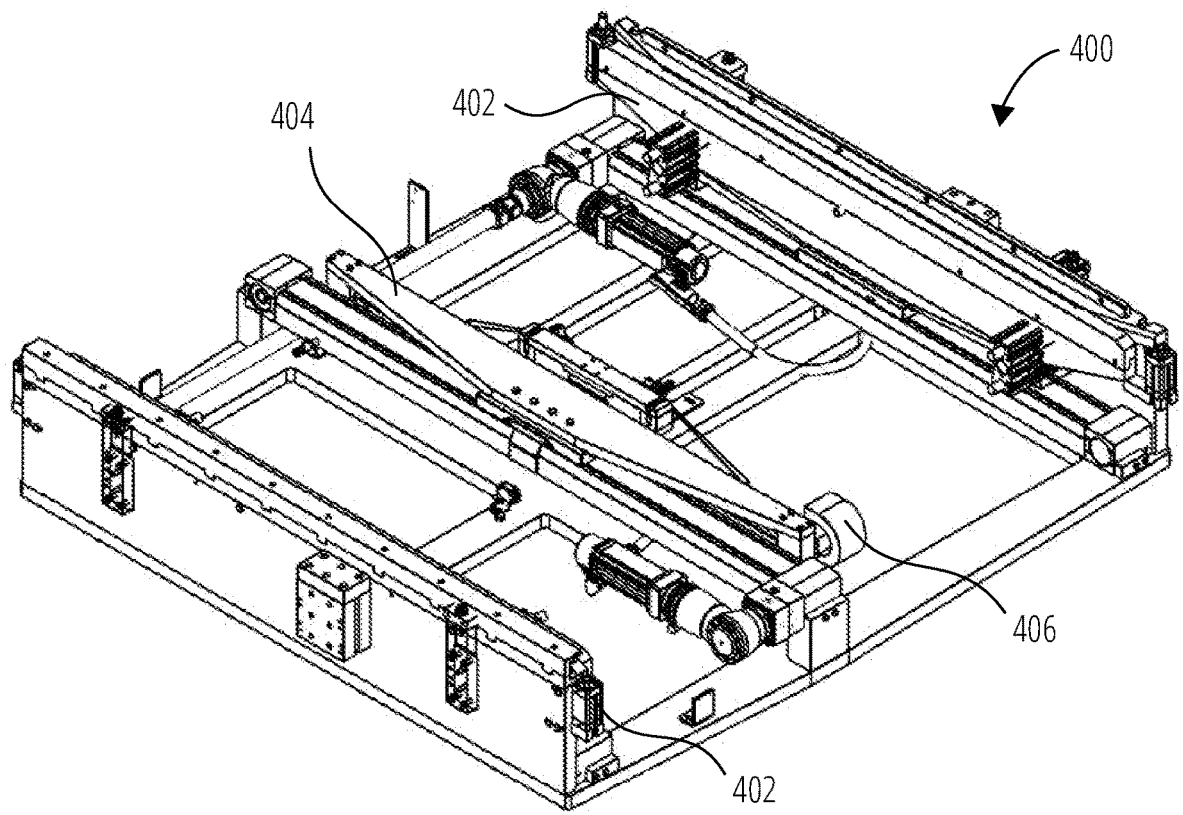
FIG. 4B illustrates a tray movement system 400 in greater detail in accordance with one embodiment.

FIG. 4A and FIG. 4B illustrate a tray movement system 400 in one embodiment.

"Tray movement system" in this disclosure refers to a variety of components, including but not limited to a motor, a mechanical arm under control of said motor, tracks on which a growing tray slides, and a tray elevator, all utilized for the purpose(s) of extracting a growing tray from a grow module and replacing the growing tray in the same position within the grow module when the fertigation process has been completed. "Track" in this disclosure refers to a structure on the fertigation system upon which a growing tray may rest and/or slide. "Tray elevator" in this disclosure refers to a drive system powered by a motor for the purpose of raising and lowering individually growing trays from a grow module. In one embodiment, the tray elevator may transition growing trays from an upper conveyor to a lower conveyor. In one embodiment, the tray elevator may position a growing tray onto at least one nozzle for each nozzle manifold for fertigation.

The tray movement system 400 comprises various components for the purpose(s) of both extracting a growing tray 204 from the grow module 200 and replacing the growing tray 204 in the same position, or alternatively in a different position, within the grow module 200 when the fertigation process has been completed for all the plant vessels in the growing tray 204. The tray movement system 400 comprises components known to those skilled in the art for moving a tray holding fragile objects in a horizontal direction under machine-driven or manual power: at least one track 402 on which the growing tray 204 slides on once removed from the grow module 200, an arm 404 extending from the apparatus to temporarily latch onto the growing tray 204, pull it onto the apparatus and release it at the appropriate position, a configuration to raise or lower the growing tray 204 along with the tray movement system 400 into a desired vertical position along the fertigation gantry 302 (not shown), a motor (under electrical or equivalent power) to spin a belt or similar drive to extend/contract the arm 404 and power the raising and lowering configuration, all configured to also to perform this operation in reverse to return the growing tray 204 to its position within the grow module 200. In an embodiment, the arm may include a tray attachment feature 406 such as a magnetic connection, a latch, or end of arm tooling, to attach to the growing tray 204.

In an embodiment the growing tray 204 may also be lifted slightly (e.g., less than one inch) off the shelving in the grow module 200 by the arm 404 of the tray movement system 400 before being extracted. In this embodiment, slide tracks within the grow module 200 may not be needed. Short legs may be extended under the growing tray 204 (e.g., at the four corners). Said legs may be removable/adjustable for different size pots/plants.

FIG. 4B illustrates in more detail one embodiment of a tray movement system 400. The tray movement system 400 comprises tracks 402, an arm 404, and a tray attachment feature 406.

Figure 5:
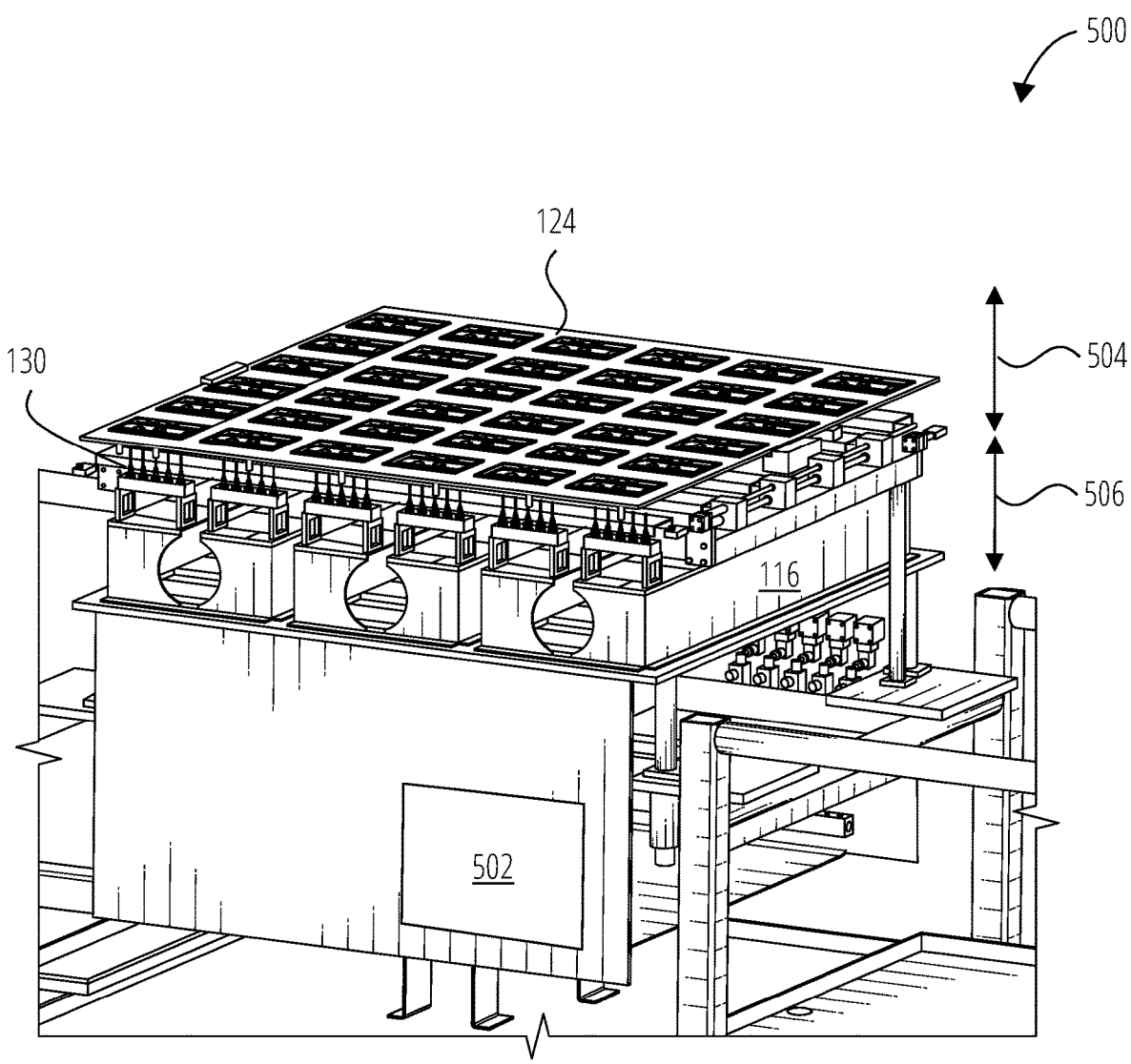
FIG. 5 illustrates a fertigation of growing tray with growing tray above nozzles 500 in accordance with one embodiment.

Referring to FIG. 5, fertigation of growing tray with growing tray above nozzles 500 is shown, illustrating how a growing tray may be positioned with respect to the fertigation system in order to fertigate plant vessels in the growing tray, in one embodiment. Once a growing tray 204 has been extracted from a grow module 200, another degree of movement, in addition to the horizontal relocation of the growing tray 204 as provided by the tray movement system 400, may situate the growing tray 204 directly above and on at least one nozzle of the fertigation system.

When the growing tray 204 is extracted from the grow module 200 as described with respect to FIG. 3, FIG. 4A, and FIG. 4B, it may be aligned in a precise horizontal position, e.g., above the nozzle manifold 116 and at least one nozzle 130 by the action of the lower conveyor 306 (not shown). Under instructions from a control system 502 and powered by a motor (not shown) the lower conveyor 306 may be adjusted such that the growing tray is repositioned vertically 504, or the nozzle manifold 116 may be adjusted such that the nozzle manifold is repositioned vertically 506. This configuration may be held for the duration of time needed for the fertigation process to complete. Once complete, the process may be reversed, raising the growing tray or lowering the nozzle manifold, such that the lower conveyor 306 may carry the growing tray away from the nozzle manifold.

Control System

The control system 502 may comprise a panel with electrical wiring and switches, typically contained within a secured metal enclosure or other container for shielding electrical wiring, switches and similar components for passing electrical power to other components such as drive mechanisms, pumps and so forth. In one embodiment the control system 502 may comprise panels with electrical wiring and switches in multiple locations, including but not limited to the grow module and fertigation system for purposes of efficiency and balancing of electrical load between power usage specific to the grow module (e.g., for lighting, fans, and so forth as previously discussed) and the fertigation system (e.g., for the first pump, second pump, tray movement system 400, and/or tray elevator 308 as discussed above). The control system 502 may additionally be configured manually by an operator or by automated or manual means under control of software able to send and receive commands to and from the control system. Any means may be used for passing said commands to/from an electrical control system 502 (e.g., containing a power source and electrical wiring and switches) as presently described.

Figure 6:
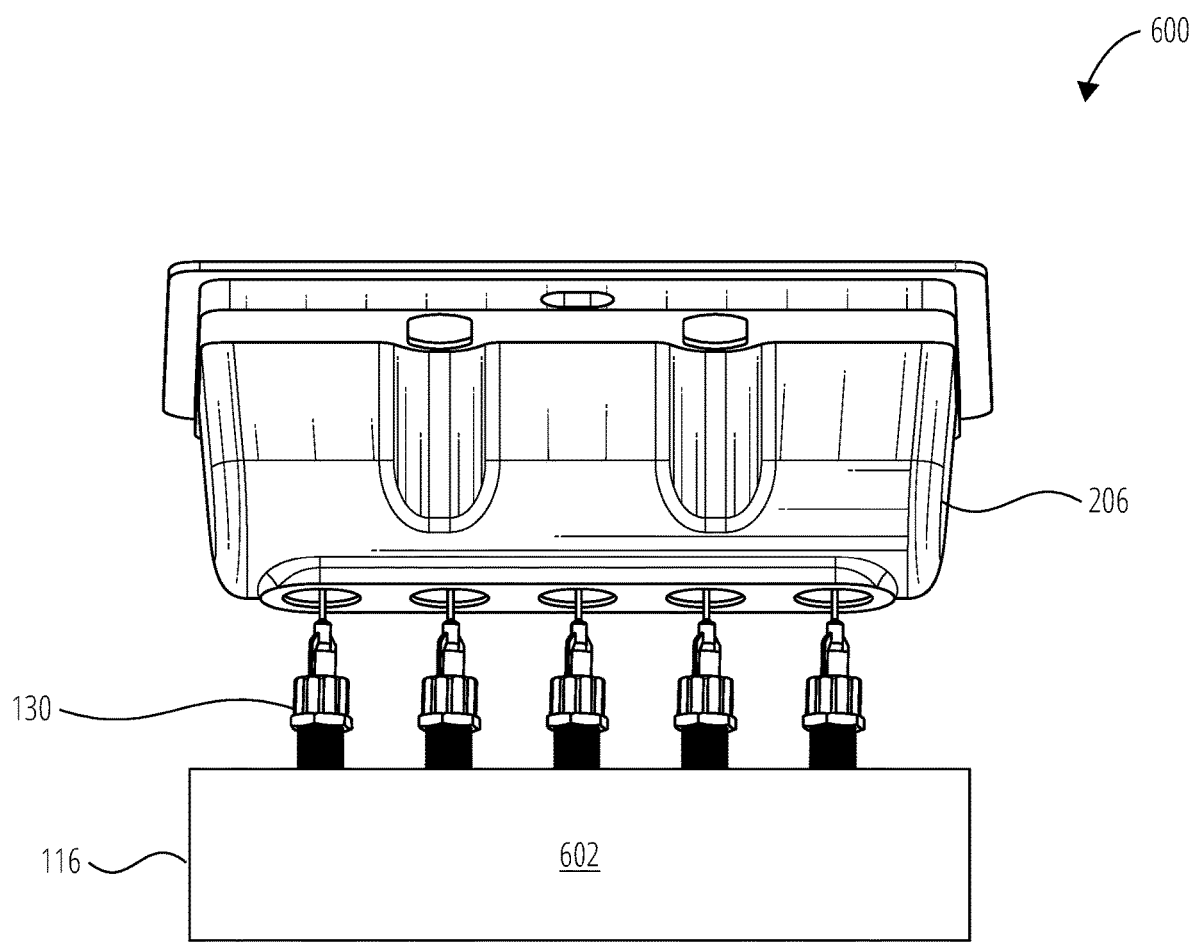
FIG. 6 illustrates a nozzle manifold and at least one nozzle penetrating a plant vessel 600 in accordance with one embodiment.

Referring to FIG. 6, nozzle manifold and at least one nozzle penetrating a plant vessel 600 are illustrated. As described with respect to FIG. 3-FIG. 5, individual plant vessels may be positioned in growing trays above an at least one nozzle. This embodiment describes how water and nutrients from the nutrient supply are delivered to the plants, seeds or seedlings, and/or shoots of plants germinating and/or growing within each plant vessel. "Nozzle manifold" in this disclosure refers to a device or chamber capable of delivering liquid and/or gas substances, and branching into at least one nozzle. "Nozzle" in this disclosure refers to a cylindrical or round aperture at the end of a pipe, hose, or tube used to control a jet of a gas or a liquid. In a fertigation system, at least one nozzle may be configured at a nozzle manifold and used to control/inject water and/or nutrients and pressurized air into plant vessels.

As noted above in FIG. 1, a second pump within the fertigation system 100 delivers a mixture of water and nutrients from the nutrient supply to the nozzle manifold 116, being in fluid communication with at least one of the first pump and a fresh water supply depending on the needs of the plants, seeds or seedlings, and/or shoots of plants in the fertigation system.

The nozzle manifold 116 comprises a number of components, each playing a role in delivering the water/nutrient mixture from the day tank or a fresh water supply to individual plant vessels within the impervious outer vessel 1202. The nozzle manifold 116 comprises a manifold header 602 comprising the fresh water supply and/or mixture of fresh water supply and nutrient supply pumped to the nozzle manifold from the first pump. The manifold header 602 then supplies said fresh water supply and/or mixture of fresh water supply and nutrient supply to the at least one nozzle 130, configured to inject said liquids into the bottom of the plant vessels on a growing tray. The at least one nozzle 130 may be a variable number, from a single nozzle to an many as may be accommodated by the manifold header 602, configured to fertigate individual plants, seeds or seedlings, and/or shoots of plants contained within a plant vessel.

In one embodiment, the at least one nozzle 130 may also inject pressurized air into either the nutrient chamber or substrate within the plant vessel as indicated by the oxygen or other gaseous needs of individual plants, and/or shoots of plants.

Manifold Header

"Manifold header" in this disclosure refers to a solid, non-permeable casing separating and protecting a manifold chamber from the multiple openings with which is associated. In a fertigation system. The manifold header 602 comprises a solid non-permeable casing separating the nozzle manifold 116 from the at least one nozzle 130, for the reason of protecting the underlying manifold machinery (e.g., tank feeds, valves, and so on) from any residual materials (e.g., water, substrate) that may fall from the plant vessels in the growing trays held in place above it. The manifold header 602 may be made of any non-reactive material, e.g., ⅛-¼ inch plastic, with the capacity for holes to be drilled through which the at least one nozzle 130 may fit.

Figure 7:
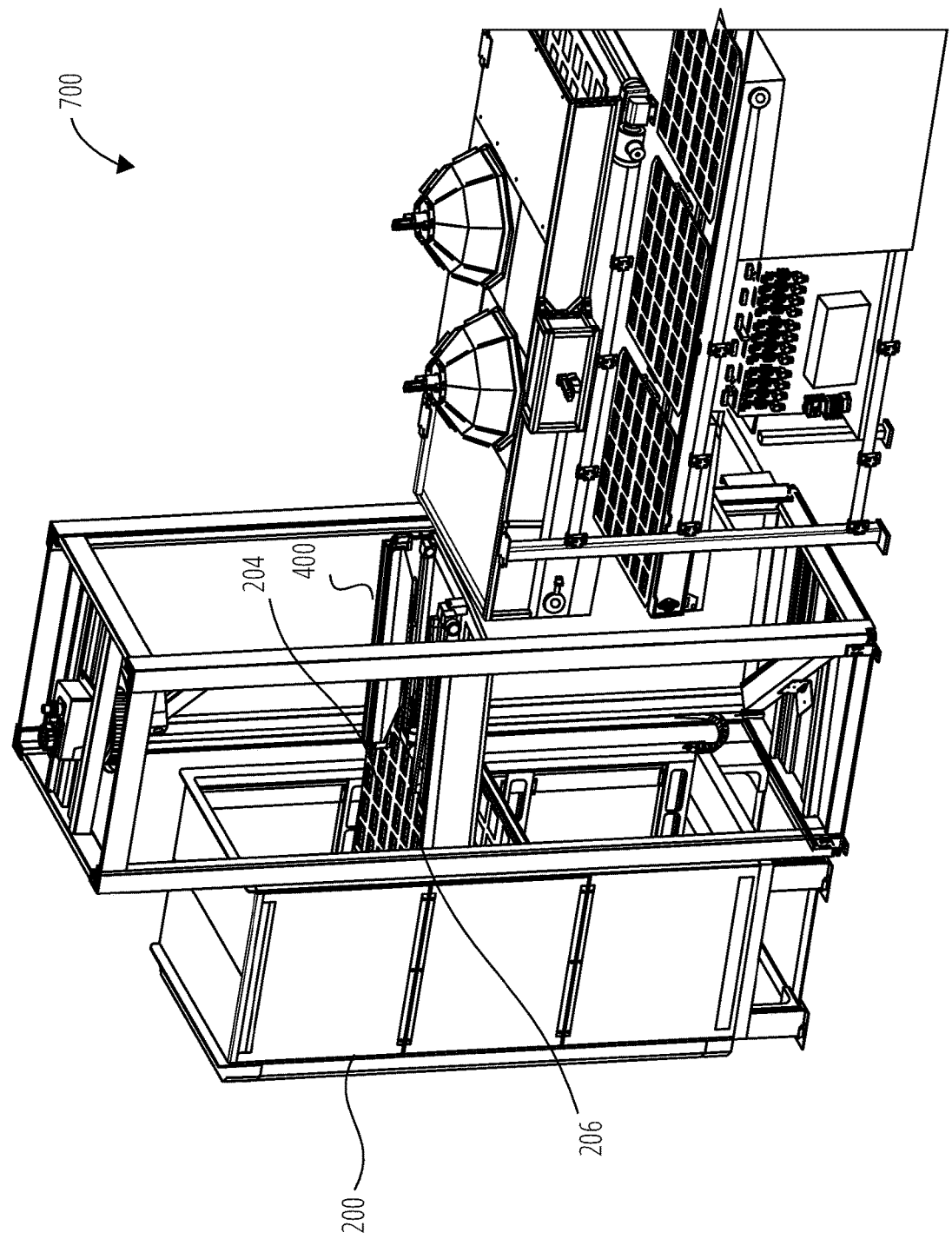
FIG. 7 illustrates a growing tray and tray movement system 700 in accordance with one embodiment.

Referring to FIG. 7, a growing tray and tray movement system 700 is illustrated to show how plant vessels 206 in growing trays 204 may be manipulated. A plurality of growing trays 204 may hold a variable number of plant vessels 206, each plant vessel containing plants, seeds or seedlings, and/or shoots of plants. The number and type of plants, seeds or seedlings, and/or shoots of plants in the plant vessels in the grow racks may be configured according to their collective fertigation needs, that is the lighting, air, and liquids needed for effective germination and growth.

Each growing tray 204 containing a plurality of plant vessels 206 may be contained within a grow module 200. As previously described, plants, seeds or seedlings, and/or shoots of plants growing in separate plant vessels may be collected into growing trays 204 according to their collective needs. Said growing trays 204, positioned within a grow module 200, may be extracted from the grow module 200 by a tray movement system 400.

Growing Tray

The growing tray 204 comprises a square or rectangular plane of solid material sufficiently rigid in composition, e.g., tempered metal or plastic, to hold a plurality of plant vessels without bending or warping. The growing tray 204 additionally may comprise a material able to be die cut in a specific pattern so that a plurality of plant vessels may be both inserted vertically into the tray and slid horizontally to lock into place in precisely aligned rows and columns, the latter being needed to align each plant vessel in a grow rack 1400 above the at least one nozzle in the fertigation system. In one embodiment, the growing tray 204 may also include a die cut notch, latch or other physical indentation by which the tray movement system 400 may be assisted in extracting, raising/lowering, and/or replacing the growing tray 204 to and from the grow module 200.

As shown, the tray movement system 400 may extract a growing tray 204 with at least two degrees of horizontal freedom from the grow module 200. Once the growing tray 204 containing a plurality of grow racks is removed from the grow module 200, the grow racks may be held in place by the tray movement system 400 while the nozzle manifold containing an at least one nozzle punctures the plant vessels in the grow racks to deliver the fresh water supply and/or water and nutrient supply from the mixing tank utilizing the first pump.

Figure 8:
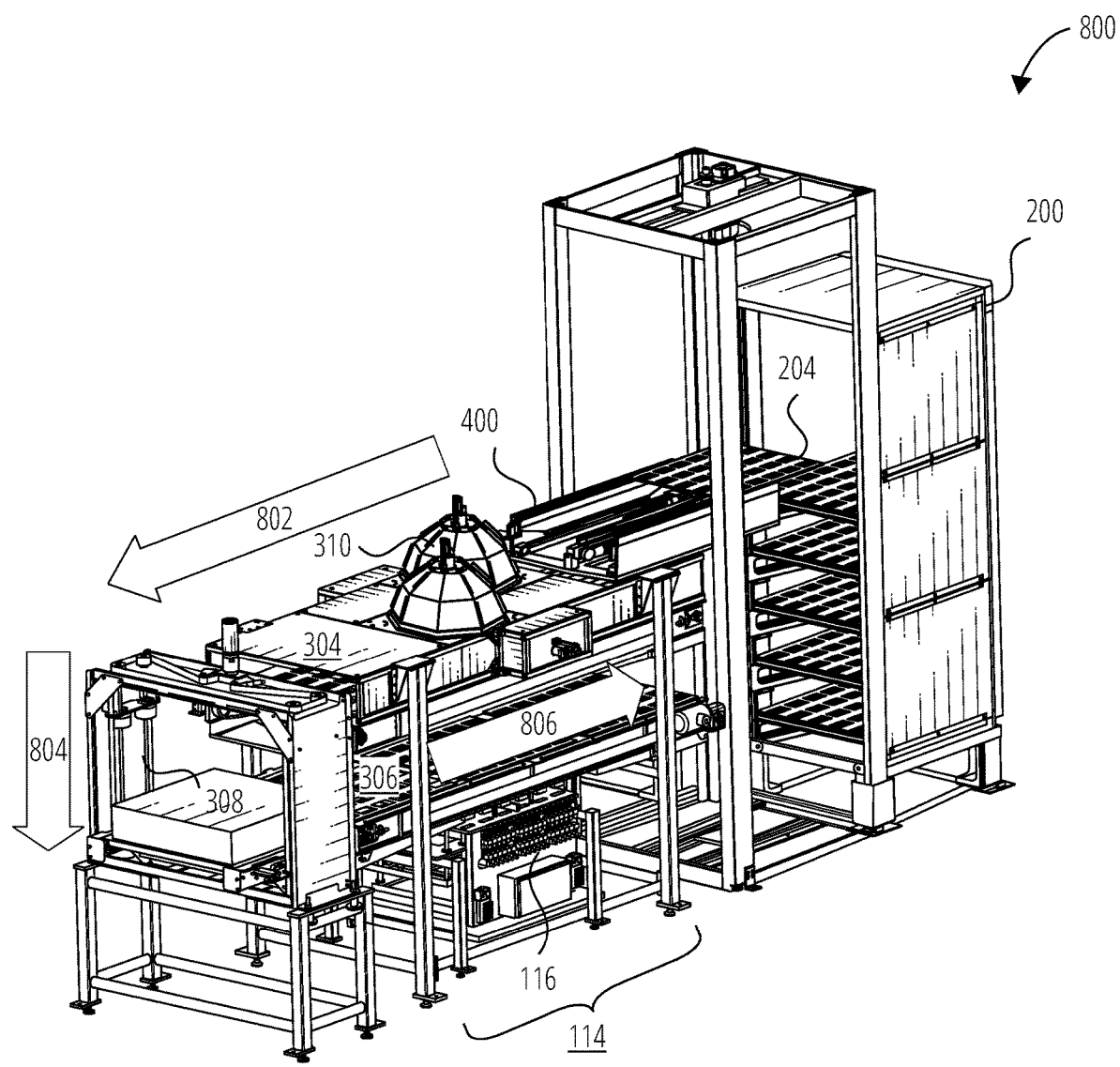
FIG. 8 illustrates a process of growing tray movement for fertigation 800 in accordance with one embodiment.

Referring to FIG. 8, a process of growing tray movement for fertigation 800 is illustrated in one embodiment. The process may begin with a growing tray 204 situated in the grow module 200 with a plurality of plant vessels situated within the growing tray 204. As shown, the tray movement system 400 may extract an individual growing tray 204 from the grow module 200. The tray movement system 400 may vertically position the growing tray 204 in alignment with the upper conveyor 304. The tray movement system 400 may then slide the growing tray 204 horizontally onto the upper conveyor 304, which may transport the growing tray 204 to an imaging station 310. After processing at the imaging station 310, the growing tray 204 may be transported by the upper conveyor 304 to the tray elevator 308. This series of actions is represented by arrow 802.

The tray elevator 308 may lower the growing tray 204 into alignment with the lower conveyor 306, indicated by arrow 804. The lower conveyor 306 may then, as described previously, carry the growing tray 204 into a precise position in the fertigation station 114 above the nozzle manifold 116, aligning the plant vessels in the growing tray 204 with the at least one nozzle, for the fertigation process. Once the fertigation process (i.e., the lowering of the growing tray 204 onto the nozzle manifold or the raising of the nozzles into contact with the plant vessels, and the plants, and/or shoots of plants in the grow rack being fertigated) is completed, the growing tray 204, nozzle manifold 116, and lower conveyor 306 may be restored to their appropriate vertical positions, and the growing tray 204 may continue down the lower conveyor 306 as indicated by arrow 806.

The tray movement system 400 may travel along the fertigation gantry 302 to the correct vertical height to reengage the growing tray 204, now at the level of the lower conveyor 306. The tray movement system 400 may elevate the growing tray 204 to its original vertical position, or to a vertical position associated with another empty area of the grow module 200 configured to support the 204 in its current configuration. The tray movement system 400 may then replace the growing tray 204 by sliding it back into its original (or alternate) position in the grow module 200. This process continues for every growing tray 204 in the grow module 200 in need of fertigation.

Figure 9:
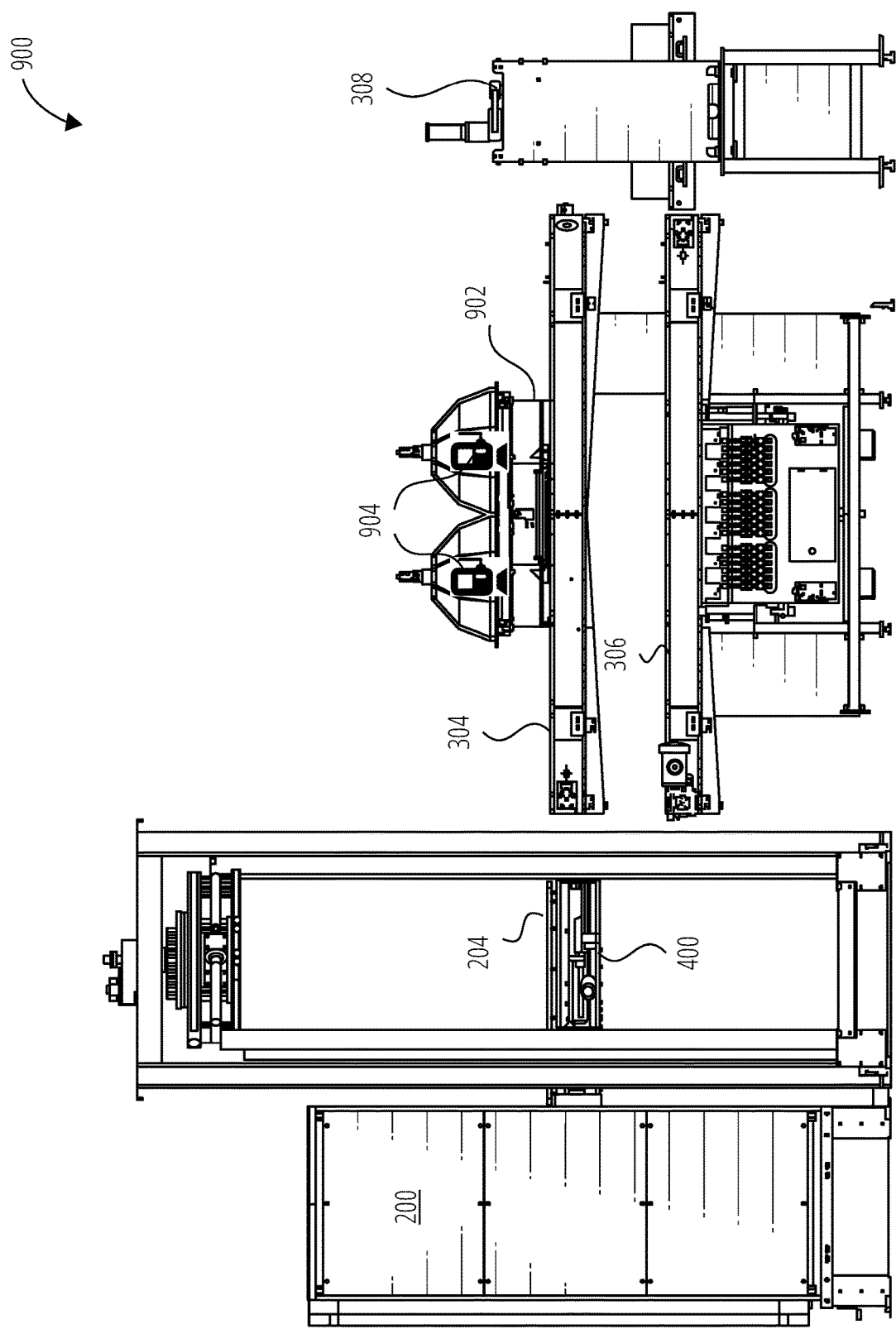
FIG. 9 illustrates an at least one camera in the fertigation system 900 in accordance with one embodiment.

Referring to FIG. 9, at least one camera in the fertigation system 900 is described. "Camera" in this disclosure refers to one or more devices used to capture still or video images under automated and/or manual control. Captured images may be digital files or images recorded by light onto film or similar media through a shutter and lens and chemically processed.

Plants being fertigated in the fertigation system may need to be monitored as to their growth progress (or lack thereof). Visual inspection and/or collection of photographic evidence may prove difficult when the plants, and/or shoots of plants remain in their respective plant vessels and grow racks inside the grow module 200, particularly when the plants have reached sufficient size, e.g., inspecting and/or photographing sizable plants near the back of the grow module 200 may not be possible. At least one camera 904, therefore, may be installed at selected locations around the fertigation system to record visual evidence of plant growth on the basis of individual plants or a collection of plants in plant vessels in a grow rack within a growing tray 204, when the latter have been extracted from the grow module 200 by the tray movement system 400 and aligned above each nozzle manifold.

At least one camera 904 may be positioned at the top of the fertigation system, secured on an apparatus attached to a vertical support of the fertigation system, e.g., a non-interfering section of the tray elevator 308. Said apparatus may be composed of a solid, non-reactive material of sufficient tension strength to hold the camera in position centered vertically and horizontally above the currently extracted growing tray 204 in the fertigation system and not subject to vibration or other disturbances that may affect camera operation(s). The camera itself may be any device that is capable of capturing, recording, and transferring still and/or video images under control of said camera configuration parameters (e.g., shutter speed, resolution, and so on). Said camera may be configured to record images both at the discretion of an operator of the fertigation system or on an automated schedule, the latter of which may be set on said camera itself by said operator. As the control system 902 controls the operation of the tray movement system 400, the tray elevator 308, the first pump and the second pump, the schedule for tray extraction/replacement as determined by the control system 902 may be synchronized with manual and/or automated control of at least one camera 904.

In addition to at least one camera 904 being positioned at the top of the fertigation system as described above, additional cameras may be positioned in other locations on or near the fertigation system to capture alternate views of the plants within the plant vessels in the grow racks having been placed in the fertigation system on the growing tray 204. As shown, said additional cameras may be secured on the first pump or second pump; as these are under control of the control system 902, camera operation may be configured by a fertigation system operator to not overlap with pump operation(s). The device specifications of said additional cameras may be the same as that described above for at least one camera 904 at the top of the fertigation system, or different—in terms of image capturing configuration (e.g., shutter speed, resolution, and so on), image capturing schedule, manual or automated control)—as determined by plant growth requirements.

Figure 10:
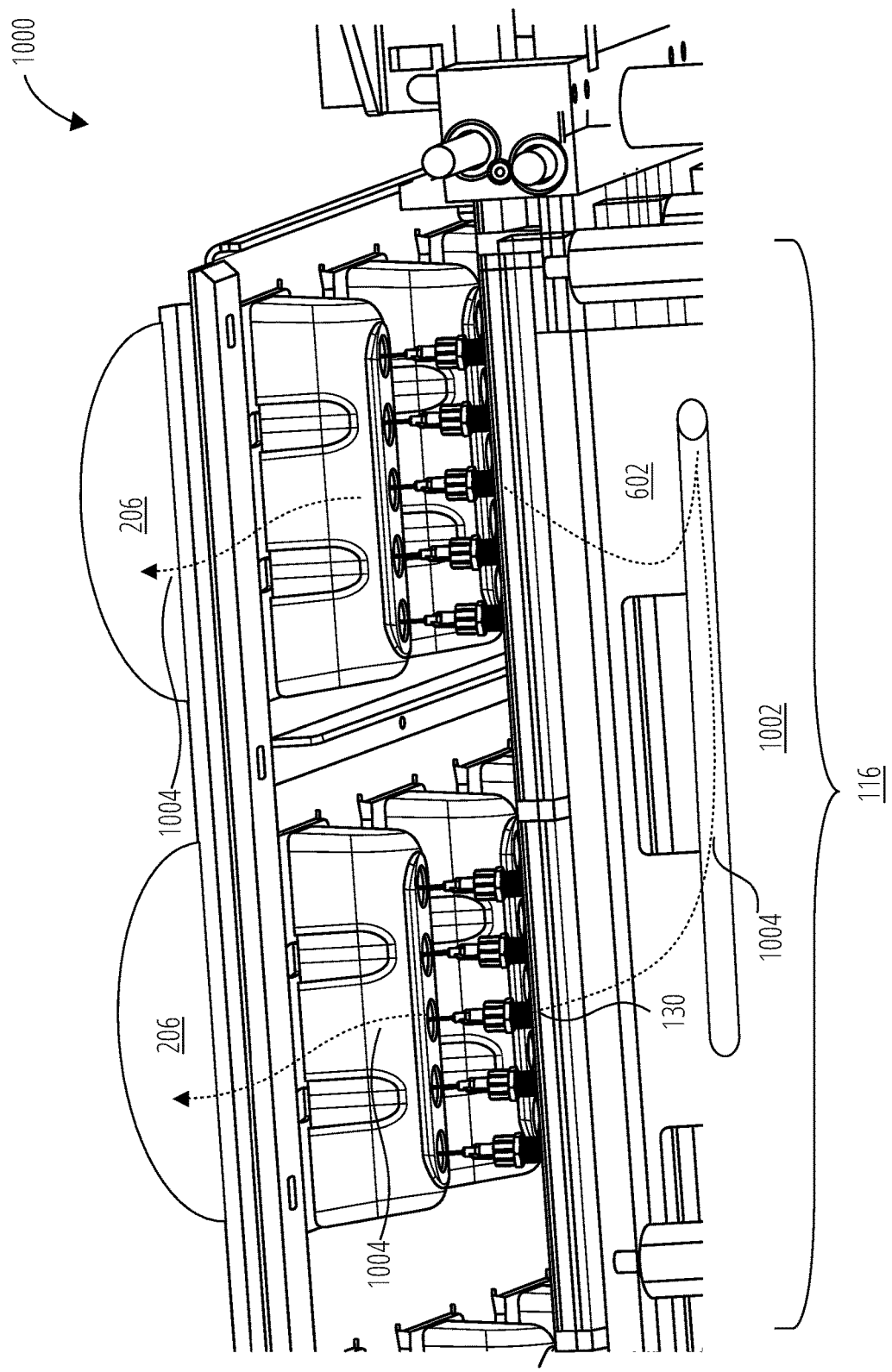
FIG. 10 illustrates a pressurized air in fertigation system 1000 in accordance with one embodiment.

Referring to FIG. 10, the utilization of pressurized air in fertigation system 1000 is illustrated. As with the utilization of the nozzle manifold and at least one nozzle penetrating a plant vessel 600 illustrated above in FIG. 6, the nozzle manifold 116 may be configured to deliver pressurized air 1004 from a pressurized air system 1002 to the at least one nozzle 130 that punctures the plant vessels 206 in a growing tray extracted from the grow module and positioned above said nozzle in the fertigation system. Pressurized air may be an important element delivered to either or both of the nutrient chamber and substrate of a plant vessel, particularly under growth conditions for said plants requiring oxygen, nitrogen or other gaseous elements able to be delivered via said at least one nozzle 130 emanating from the manifold header 602.

The delivery of pressurized air in fertigation system 1000 may need a separate means of access for said pressurized air 1004 to the nozzle manifold 116 for distribution to the at least one nozzle 130. A separate nozzle manifold 116 to deliver pressurized air 1004 may be utilized or said pressurized air 1004 may be delivered via the same nozzle manifold 116 delivering water, nutrients, or some combination of the two, depending on the configuration of said nozzle manifold 116 (e.g., whether said nozzle manifold may accommodate separate nozzles for liquids and gasses). The means of accessing and supplying gaseous elements for plant growth to the nozzle manifold 116 may be similar to that for delivering water and/or nutrients to the nozzle manifold 116 as described in FIG. 6 above. A supply of the elements—in this case gaseous (e.g., oxygen, nitrogen, and so on)—may be manifested by a storage tank located within the fertigation system and transferred to the nozzle manifold 116 by an air pump able to transfer pressurized air 1004 in the pressurized air system 1002. Said storage tank, air pump, and a piping connection to the nozzle manifold 116, may be devices and configurations known to those skilled in the art for delivering pressurized air from a tank to a manifold.

In one embodiment the configuration of delivering pressurized air as described above may be under control of the control system in a manner consistent with said control system controlling the delivery of water and/or nutrients from the day tank to the nozzle manifold via the first pump and/or delivery from the mixing tank to the day tank via the second pump.

Figure 11:
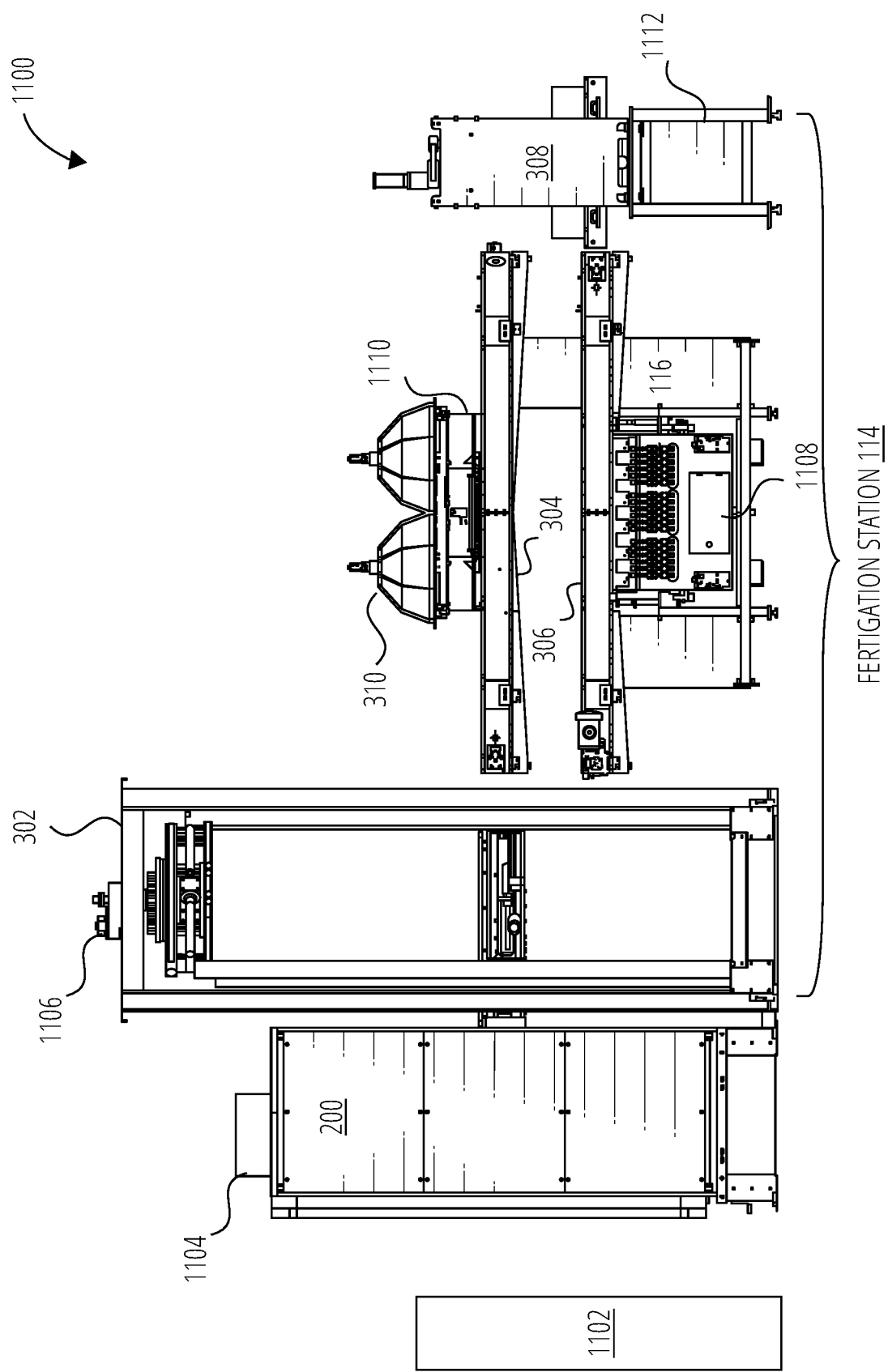
FIG. 11 illustrates a control system 1100 in accordance with one embodiment.

Referring to FIG. 11, an exemplary control system 1100 is illustrated. To provide a means to control at least the electrical, pneumatic, motive, and otherwise actuated and powered fertigation system components, the control system 1100 is disclosed. The control system 1100 may comprise a panel with electrical wiring and switches, typically contained within a secured metal enclosure or other container for shielding electrical wiring, switches and similar components for passing electrical power to other components such as drive mechanisms, pumps, and so forth, such as may be included in a stand alone cabinet, as indicated by control system 1102. In one embodiment, the control system 1100 may comprise panels with electrical wiring and switches in multiple locations, including but not limited to, the grow module 200, as indicated by control system 1104, the fertigation gantry 302 as indicated by control system 1106, the nozzle manifold, upper conveyor 304, and lower conveyor 306, as indicated by control system 1108, the imaging station 310 as indicated by control system 1110, the tray elevator 308, as indicated by control system 1112, and other components throughout a plant growing facility, for purposes of efficiency and balancing of electrical load between power usage specific to the grow module 200 (e.g., for lighting, fans, and so forth as previously discussed), the fertigation station, etc. The control system 1100 may additionally be configured manually by an operator or by automated or manual means under control of software able to send and receive commands to and from the control system 1100. Any means may be used for passing said commands to/from an electrical control system 1100 (e.g., containing a power source and electrical wiring and switches) as presently described.

Control System

"Control system" in this disclosure refers to a device including a processor, logic, electrical wiring, switches, and similar components, for controlling and passing electrical power to other components or devices. This may be housed within a secure enclosed container, typically metal or plastic, for shielding these components. In one embodiment, the control system may synchronize and optimize all aspects of the environment across the automated growing facility. This may be accomplished to meet plant needs with precision for optimal plant experience, growth, and harvest yield. The control system may receive sensor inputs indicating temperature, airflow, humidity, carbon dioxide levels, and other ambient or environmental variables in the growing chambers or other parts of the automated growing facility. The control system may adjust heating, ventilation, and air conditioning (HVAC) operation in order to counter, maintain, or enhance conditions indicated by sensor inputs. "Sensor" in this disclosure refers to one or more sensing devices able to detect precise measurements of light, temperature, humidity, and/or other conditions of its surrounding environment.

In one embodiment, the control system may instruct the grow module transport devices to locate specific modules based on their machine-readable identification applied to each grow module. "Machine-readable identification" in this disclosure refers to a graphic or visible identifier able to be interpreted without human interaction. Exemplary machine-readable identification includes radio frequency identifier (RFID) or near field communication (NFC) devices, barcodes and quick response codes. The control system may also provide the grow module transport devices with the grow module's known location, known time elapsed since plants in a grow module were last fertigated, or other parameters. The control system may thus instruct a grow module transport device to find specific grow modules and transport them to appropriate stations based on algorithms or protocols determined for facility operation, and based on known locations of stations throughout the facility.

In one embodiment, the control system may receive information on the type of plants intended to be fertigated, the phase of growth plants within a grow module have reached, based on time elapsed since planting, images captured of the plants, or other data. Based on this data, a nutrient input system may distribute desired levels of desired nutrients into the mixing tank. The control system may control an amount of fresh water mixed with the nutrients, a duration of mixing, and the addition of other elements. The control system may instruct a pump to move the nutrient/water mixture from the mixing tank to a day tank or a tank for immediate use at the fertigation station. Based on machine-readable identification for a grow module brought to the fertigation station, as well as machine-readable identification for growing trays pulled from the grow module for fertigation, the control system may control the timing, speed, and duration of operation for a pump delivering the nutrient/water mixture to the nozzle manifold.

In one embodiment, the control system may control the operation of the fertigation gantry lift, the tray movement system, the upper conveyor and lower conveyor, the camera tunnel or imaging station (having at least one camera) and the tray elevator of the fertigation station. In this manner, based on weight or location sensors in one embodiment, the control system may control the movement of growing trays as they are removed from the grow module, placed on the conveyors, imaged, fertigated, and returned to the grow module. The control system may read a machine-readable identification provided on the growing tray, as well as imaging data captured by the at least one camera, to determine the motion, speeds, durations, etc., for which each growing tray may be handled with optimal consideration for the needs of the seeds, seedlings, shoots of plants, or plants disposed within that growing tray. As indicated by the weight of plant vessels or other considerations, the control system may instruct a vessel clamping system operating in concert with the injection system such that plant vessels are secured and will not dislodged from or disrupted within their growing tray during fertigation.

In one embodiment, the control system may receive input from sensors within the grow module, indicating temperature, humidity, airflow, or other conditions within the grow module. Based these inputs, in conjunction with known time elapsed since planting, imaging data for plants within the growing trays of the grow module, and/or other parameters, the control system may control a ventilation system for the grow module, as well as lighting channels powering LED patterns in the lighting arrays of the light trays within the grow module. In this manner and as previously described, conditions experienced by seeds, seedlings, shoots of plants, and plants within the automated growing facility, such as temperature, humidity, airflow, carbon dioxide levels, water, nutrients, light intensity, wavelength, and exposure, and more, may be controlled across the facility and down to a tray-by-tray or plant-by-plant granularity by the automated growing facility's control system.

Figure 12:
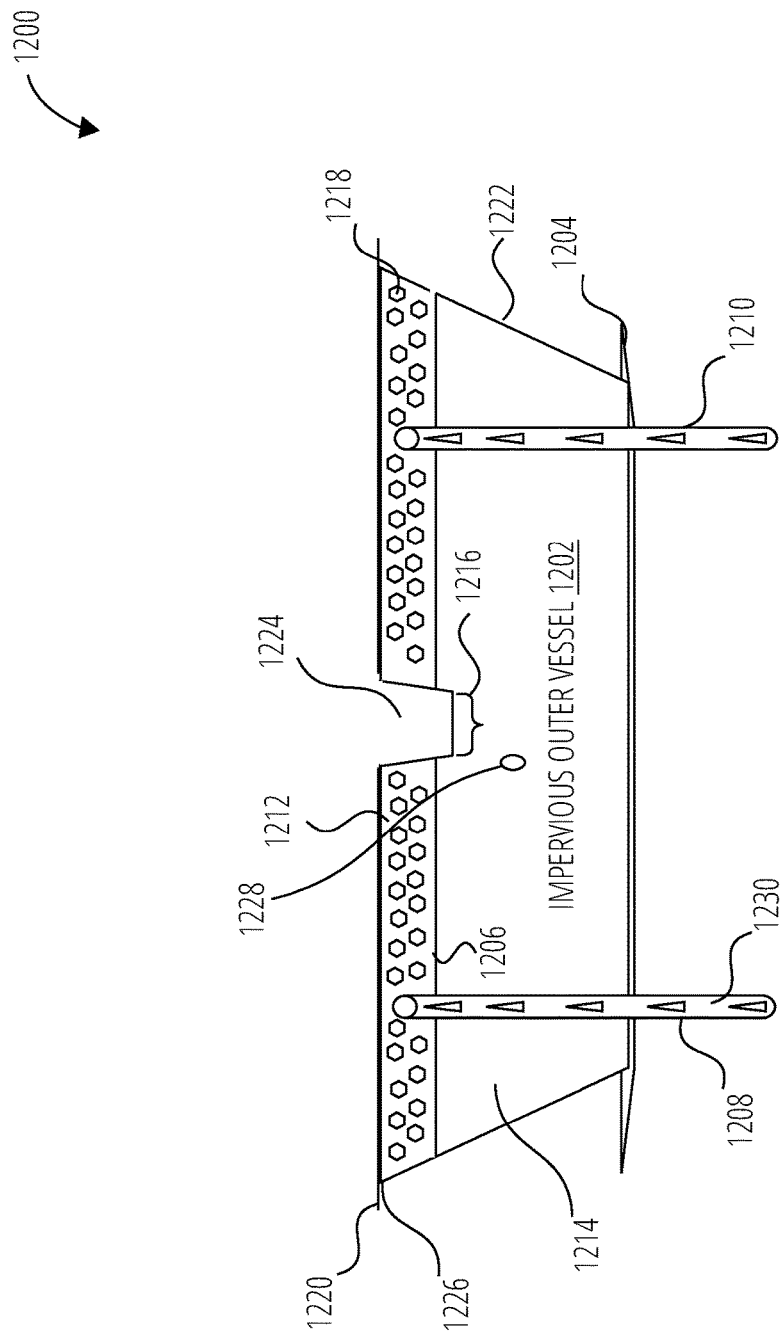
FIG. 12 illustrates a plant vessel 1200 in accordance with one embodiment.

Referring to FIG. 12, a plant vessel 1200 is illustrated. An impervious outer vessel 1202 shows two stratified layers within its vertically oriented walls 1222: an upper nutrient chamber containing nutrients 1218 and a substrate 1214 layer containing a root zone and organic materials providing for the growth of seeds or seedlings. "Vertically oriented walls" in this disclosure refers to supports of an object at substantially right angles to a horizontal plane; in a direction, or having an alignment, such that the top is directly or approximately above the bottom.

A pervious membrane 1206 separates these two stratified layers, composed of a number of materials known to those skilled in the art, e.g., [membrane materials], with its permeability gauged according to specific the specific plant type being grown. "Pervious membrane" in this disclosure refers to a type of biological or synthetic membrane allowing materials, typically but not exclusively liquids, to pass through it by diffusion. The impervious outer vessel 1202 additionally contains a base 1204 for the purpose of retaining excess water or substrate during transport or when individual plant vessels are contained within a fertigation system. "Base" in this disclosure refers to the lowest portion or edge of an object, especially the portion on which it rests or is supported.

The top of the nutrient chamber 1212 comprises both a top rim 1226 and a cover 1220 forming a seal at the top rim to ensure enclosure of the nutrients 1218. "Top rim" in this disclosure refers to the upper or outer edge of an impervious outer vessel, typically circular or approximately circular. "Cover" in this disclosure refers to an object that lies on, over, or around another object, especially in order to protect or conceal the object. The cover 1220 contains a circular opening, a seed pocket 1224, into which seeds or seedlings 1228 are deposited into the substrate 1214 through an aperture 1216. "Aperture" in this disclosure refers to an opening, hole, or gap, specifically through which seedlings or shoots of plants would pass during growth.

Note the horizontal level of said aperture 1216 is below the pervious membrane 1206, ensuring that the deposited seeds or seedlings 1228 avoid direct contact with the nutrients 1218 is the nutrient chamber 1212. The nutrients 1218 within the nutrient chamber 1212 are isolated from the seed pocket 1224, where a portion of the pocket proximate to the nutrient chamber 1212 is isolated from the nutrient chamber by a portion of the cover 1220 being sealed to the pervious membrane 1206, such that the nutrients 1218 do not come in contact with seeds or seedlings in the seed pocket 1224. "Pocket" in this disclosure refers to a cavity containing a deposit, such as seeds, seedlings, or shoots of plants.

A fertigation system provides for water 1230 being added to the impervious outer vessel 1202. The fertigation system commences with a freshwater supply being pumped through a plurality of nozzles puncturing the base 1204 of the impervious outer vessel 1202. A raw water nozzle 1208 or raw water nozzle 1210 supplies water 1230 to either the nutrient chamber 1212 or substrate 1214, depending on the fertigation needs of an individual plant or set of plants. In particular, plants in the form of seeds or seedlings 1228, e.g., in early development stage, need water 1230 in the substrate 1214 but not in the nutrient chamber 1212 since the latter may not be needed and may be potentially harmful until germination. Once the seeds or seedlings 1228 have germinated and are ready to receive diluted nutrients, water passing through the raw water nozzle 1208 or raw water nozzle 1210 enters the nutrient chamber 1212 in precisely measured amounts calibrated to the type of plant or plants whose seeds or seedlings have germinated. "Nutrients" in this disclosure refers to the solid (e.g., non-liquid and non-gaseous) chemical elements, including nitrogen, phosphorus, calcium, and potassium, essential to the nourishment of plant health. The nutrients 1218 mixed with water 1230 from the nozzles then pass through the pervious membrane 1206 to enter the substrate 1214 stratified layer and fertilize the germinated seeds or seedlings. The amount of permeability of the pervious membrane 1206 is again calibrated to the type of plant or plants whose seeds or seedlings have germinated.

Plant Vessel

The plant vessel 1200 (i.e., container) may be made of any appropriate material for facilitating storage of a plant and may be readily identified by persons of ordinary skill in the art. The basic requirements include the ability to isolate the root mass and substrate 1214 with a relative moisture barrier. It is also preferred that the plant vessel 1200 material be able to withstand minor impacts without breaching the barrier provided. Finally, materials are optimally chosen to avoid leaching of chemicals into the substrate 1214.

In some embodiments, insulating materials are preferred for the plant vessel 1200. For example, if known shipping conditions may expose the plants to drastic temperature fluctuations, an insulated plant vessel 1200 material may buffer the root mass and provide more stable temperature in the substrate 1214. Thus, it may be desirable if extreme temperature increases may be avoided during the heat of the day, but meanwhile some of that substrate heat is retained into the cool of the night. Furthermore, an insulated material may reduce shock experienced with quick temperature fluctuations to which many plants are susceptible. Slower temperature changes help keep the turgor pressure of the plant steady and maintain nutrient uptake and overall plant health, whereas a rapid temperature change disrupts this pressure and slows or temporarily stays the uptake of the plant and results in poor development and health.

Exemplary, non-limiting materials for the plant vessel 1200 include appropriate plastics (e.g., polystyrene, polystyrene foam, or polypropylene) and cellulose (with optional water barrier), and the like. Plant vessel 1200 material may be sourced from plant-based materials to minimize environmental impact due to their biodegradability and renewability. For example, plant vessel 1200 material may be sourced from soy, corn, potato, soybeans, and the like.

In some embodiments, the plant vessel 1200, in single modular form, may have an internal volume from about 5 to about 500 cubic inches, from about 5 to about 100 cubic inches, from about 10 to about 75 cubic inches, from about 10 to about 50 cubic inches, and from about 10 to about 25 cubic inches. In some embodiments, the plant vessel in single modular form has an internal volume of about 5, 7, 10, 15, 20, 25, 30, 35, 40, 50, 75, 100, 150, or 200 cubic inches.

While the plant vessel 1200 assembly is described above and illustrated as a single and distinct unit, persons of ordinary skill in the art will readily appreciate that the disclosed plant vessel 1200 assembly may be repeated and/or serially expanded into an assembly with a plurality of connected plant vessel 1200 (e.g., with plants contained therein), such as a tray or rack of one or more rows of plant vessels.

Cover

As indicated above, the plant vessel 1200 assembly comprises a pliable cover substantially sealed against the plant vessel 1200. Typically, the cover 1220 is substantially sealed against the top rim 1226 of the plant vessel 1200. The sealing is typically completed after the substrate 1214 is placed into the interior space of the plant vessel 1200. In some embodiments, the sealing is completed without a seed or plant part in the substrate 1214. The seed or plant part may be inserted later through the aperture 1216 in the cover 1220.

The term "substantial sealed" and grammatical variants thereof indicate that contact is maintained between the cover 1220 and the plant vessel 1200 such that it substantially impedes air or vapor communication between the interior and exterior of the impervious outer vessel 1202 to prevent non-transpiration water loss. In this regard, it is preferred that the majority of all water loss from the interior of the impervious outer vessel 1202 be the result of plant transpiration (i.e., when the plant has a leaf mass on the exterior of the plant vessel 1200) and not from evaporation and airflow between the interior space and the exterior. Use of "substantial" indicates that some evaporation or leaking is permitted, but the escape is slowed to maintain sufficient hydration within the substrate 1214 for a prolonged period of time. The sealing may be implemented according to any appropriate method known in the art, including use of heat sealing (to bond components together), gluing, or use of fasteners, such as clamps, elastic bands, and the like, to maintain a substantial seal.

The pliable cover 1220 has at least one aperture 1216 that is sufficiently large to provide ambient light penetration into the interior space of the plant vessel 1200 such that the shoot extending from a germinating seed may extend upward through the aperture 1216. However, the aperture 1216 may simultaneously be sufficiently small to allow contact with the sides of the stem of the growing plant once it grows through the aperture 1216. Thus, the aperture 1216 is smaller than the crown of the plant being produced when at its mature stage of growth. The contact between the stem and the aperture 1216 edge provides an additional seal to substantially prevent escape of humidity and, thus, preserve the hydration of the root mass while maintaining a lower humidity for the leaf mass.

The cover 1220 is a pliable cover. The term "pliable" is used to indicate that the cover 1220 is flexible and may be moved or bent with the application of pressure. Typically, the cover 1220 is overlaid on the plant vessel 1200 in a relatively taut configuration and sealed against the rim of the plant vessel 1200, as described above. As the plant shoot/ stem penetrates through the aperture 1216, the edge of the aperture 1216 contacts the stem to create a seal by function of the pressure applied by the stem. As the stem grows and expands in diameter, the stem applies additional pressure on the edge of the aperture 1216 in the cover 1220. Due to the pliability of the cover 1220, the cover 1220 yields to the increased pressure applied by the growing stem and the aperture 1216 expands to accommodate the increased stem width. Preferably, the pliability is such that the seal is maintained while not significantly impeding the growth of the stem.

The nature of the material used for the cover 1220 may, in some degree, be determined by a person of ordinary skill in the art considering the specific plant variety of plant produced and stored in the plant vessel 1200. The weight and composition of the membrane material may be strong enough to stay adhered to the plant vessel 1200 and withstand the elements during storage/transport and growth of the plant. However, the cover 1220 may still be pliable enough to allow the crown/stem of the plant to stretch and displace it while maturing (as described above). Accordingly, a person of ordinary skill will be able to determine the most appropriate cover for the target application.

Exemplary cover 1220 materials include sheets of plastic, foil, and the like. Illustrative, non-limiting examples of cover materials include: polystyrene, polypropylene, foil and metallic materials, plant-based polymers (e.g., sourced from corn, potato, soybeans, and the like). The membrane may be any degree of opacity. In some embodiments, the cover material is capable of receiving print or embossing to accommodate branding or other markings.

In some embodiments, the cover 1220 is substantially planar. However, in some embodiments, the cover has some topography configured to permit air to circulate in channels even if a planar leaf is disposed against the cover. For example, pronounced embossing of the membrane material, such as foil, which is capable of holding its embossed pattern, may create channels of airflow by creating separation from a contacting leaf. The channels prevent the decay of leaves that contact the membrane for extended periods of time during the production and distribution process. While the leaves do not require significant ventilation, the air channels prevent leaf suffocation due to lamination of the flat surface of the leaves to the flat surface of a flat membrane. A certain variation of texture of this membrane that created enough separation between the leaves and membrane, even if just a "course" texture, or channeling, may suffice to prevent this suffocation and decay, for extended periods of time.

The number of apertures and the size of the apertures may vary depending upon the variety of product being produced. In some embodiments, the at least one aperture 1216 in the cover 1220 ranges from about 1/16 inch to about 3/8 inch, depending upon the variety being produced.

The number and spacing of multiple apertures also depend upon the variety of the product and the end product desired. Micro greens, edible flowers and nutritional grasses may grow better with a frequency of up to about 30-40 apertures per square inch in the cover 1220. In contrast, plants with small leaf mass per seed, such as spinach, may grow better with about 1-5 apertures per square inch, such as 1-2 apertures per square inch, to achieve the foliage density desired. Heading lettuces typically need one aperture in the center of the plant vessel 1200, unless a mix or blend of lettuces in a single plant vessel 1200 is desired.

In some embodiments, the plant vessel 1200 assembly contains a mix of multiple plant types (e.g., lettuces). For example, in the embodiment with multiple lettuce varieties, about 3-5 apertures may be placed evenly around the near perimeter of the membrane. The different varieties of lettuce are placed in these apertures, resulting in a single plant vessel 1200 with a mix of living lettuce/greens in a single product. The benefit of this specific embodiment for the producer is that this "mixed" product is produced in a much shorter time frame as the goal is to realize 3-4 petite products, requiring 20-30 days of growing time as opposed to a single variety of lettuce requiring up to 50 days in the system in order to reach full size. The benefit to the consumer is that one may otherwise have to purchase 3-4 separate products in order to realize this mix, or be confined to purchasing a "cut" mixed product of compromised freshness, longevity, appearance, and nutritional value.

Pervious Membrane

The pervious membrane 1206 may be made of any material that allows nutrients and water to flow through but allows the separation of the nutrients 1218 from the substrate 1214.

Nutrient Chamber

The nutrient chamber 1212 may include nutrients 1218 of any variety that is beneficial for a specific type of plant. Examples include nitrogen, phosphorus, potassium, and calcium, but are not limited thereto.

The nutrient chamber 1212 may be constructed by creating seals between the pervious membrane 1206 and the cover 1220, both at the outer diameter near the portion of the cover applied to the top rim 1226, and around the pocket portion of the cover. Nutrients 1218 may be added before either seal is created, thereby forming the nutrient chamber 1212.

In another embodiment, the nutrient chamber 1212 may be formed by starting with a pillow shaped chamber with one side constructed of cover material and the other side constructed of pervious membrane 1206 material, filled with nutrients 1218, that is sealed around its circumference and is approximately the same size as the top rim 1226 of the plant vessel 1200. A center portion of the pervious membrane 1206 is sealed to the center portion of the cover material to create the pocket (without an aperture 1216). In an embodiment, the pocket is formed and an aperture 1216 inside the pocket is made as part of the sealing process.

Substrate

The composition of the substrate 1214 (i.e., growth medium) is determined by the known requirements of the plant or plants being cultivated in the plant vessel 1200. For example, different compositions of soils are known for applications in cultivating a wide variety of edible and ornamental plants and may be readily and appropriately chosen by persons of ordinary skill in the art.

The substrate 1214 may also comprise the additions of fertilizers, nutrient additives, mineral supplements, beneficial commensal microorganisms, and the like, to optimize the growth conditions. Additionally, if so desired, the substrate 1214 may also comprise effective amounts of pesticides, selective herbicides, fungicides or other chemicals to remove, reduce, or prevent growth of parasites, weeds, pathogens, or any other detrimental organisms. The formulation of nutrient recipes for the substrate 1214 may be adjusted as appropriate for the variety of the plant produced and shipped. In some embodiments, the nutrient formulation may be modified by augmenting or even reducing specific minerals to optimize and regulate the growth rate of the plant within the packaging, and maintain or enhance the color of the plant. To illustrate, if a basil plant is suddenly placed in a dark environment for an extended period of time, the plant may initially accelerate its growth rate in an attempt to "reach" for and regain the sunlight it no longer receives. This type of rapid growth is problematic for packaged plants because it exhausts the energy and nutrient stores of the plant. Specific mineral recipes may reduce or slow this growth spurt during the storage conditions, thus preserving and promoting long-term vibrancy of the plant. In addition, nutrient formulations may be routinely adjusted to promote keeping color and crispness while plant is packaged and in transport.

Optimized choice and assembly of the substrate 1214 may thus be based on various considerations of the plant being cultivated. A brief discussion of considerations is provided. First, different varieties of plants have different root structures within the plant vessel 1200. The size (length and girth) of "mature" roots may occupy a large portion of the "limited" space within the plant vessel 1200. This may necessitate the use of an absorbent and expansive material within the substrate to temporarily expand and occupy the substantial volume within the plant vessel 1200 during germination. When at germination or early in the growth phase, the plant vessel 1200 volume is preferably filled mostly with substrate in order to support the seed or young plant mass near the top and aperture 1216 of the membrane. The substrate is also ideally stable, minimized voids or shifting, to ensure that the seed/seedling remains stable and in its position at or near the aperture 1216 for a sufficient time to allow for germination extension of the stem through the aperture 1216 and for the roots to penetrate into the substrate. As the roots increase in quantity and size, they may be able to "displace" this originally expanded material and utilize the volume of area that the expandable material was occupying. This allows the roots to fully mature and develop without becoming root bound and compressed too tightly within the plant vessel 1200.

Second, nitrogen, phosphorus, and calcium are nutrients that contribute to rapid growth cycles of many plant varieties of interest. Many plant varieties typically need large amounts during their rapid growth cycle. These nutrients may not be "organically" sourced for water in water-soluble methods of growing and are not compliant with the National Organic Program (NOP) and United States Department of Agriculture (USDA). This means that "Organic Certification" as a hydroponic facility is not possible. To overcome this, and to facilitate organic certification, calculated amounts of approved "organic" nitrogen, phosphorus and calcium nutrients may be included in the substrate 1214. However, to avoid problems of "nutrient toxicity", i.e., burning from the intense sources of concentrated fertilizers, while still providing sufficient sources of nitrogen, phosphorus and calcium, the organic sources may be preprocessed prior to incorporation. This preprocessing entails exposure to relevant microbial activity before they are added. The exact quantities of the desired nutrients are calculated for the full growth and expression of the subject plant. The source nutrients are initially provided in compressed, pelleted form. The pellets are introduced to a small colony of beneficial bacteria within this substrate combination. As the microbial activity commences, the colony of bacteria is small and thus processes a small amount of the organic nutrients. As this processing continues, the byproducts of this microbial-driven breakdown are now able to be taken up by the plants' roots. As time goes on, the colony of bacteria and microbial activity increases, resulting in more and more nutrients being made available to the plant roots. Because the reproduction of this microbial colony is exponential, so is the processing and availability of the nutrients. This process results in a controlled time release of absorbable forms of the nutrients. This process prevents nutrient toxicity in the beginning stages of the plants' development and provides amounts of absorbable nutrients commensurate with the growing demand of the growing plant, including in the final trimester of growth when the demands are highest. This process is critically essential to the success of growing fully expressed plants in exceptionally small and sealed plant vessels.

Third, considering that the plant vessel 1200 is sealed, the source of additional oxygen to the root system is by way of introducing the water for hydration. Oxygen is contained in or on the surface of the water and is carried to the plant roots. If this oxygen level is not sufficient, organically approved oxidizing agents may be added to the substrate to promote further oxygenation in the root zone.

In some embodiments, the substrate 1214 further comprises a thickening agent. The thickening agent creates an effect that is similar to a naturally occurring event in the plant's life. When the end of a growing season is nearing, the plant may experience certain environmental signals that induce the plant to produce latex. The environmental signals are often based on increasing scarcity of resources. For example, the length of day shortens, sunlight intensity reduces, hydration might reduce, or food for the plant is scarce. Latex in a lettuce plant, for example, is thicker than water and very bitter in taste. The plant produces this latex to slow circulation and, thus, slow the perishing process and extend its life long enough for the plant to quickly go to seed and flower for self-preservation of the species. Like natural latex, the thickening agent slows the plant's transpiration rate and, thus, slows the plant's uptake of water from the substrate 1214 during the prolonged period of storage in the plant vessel 1200 assembly. Furthermore, the metabolism and growth is correspondingly slowed and, thus, conserves nutrients. This effective "rationing" of water maintains the moisture level in the substrate 1214 for a longer period of time and prevents the plant from exhausting the life supporting resources during shipping. This extends resiliency of the plant during storage of and improves the final product in the marketplace.

Exemplary, non-limiting thickening agents include agar and gelatin-based products.

Agar-agar is a vegan based gelatin, made from algae. Agar-agar may be used, depending on the shelf life extension desired, with certain varieties of produce. By mixing this gelatin in water, with a specific ratio, one may manipulate the viscosity of water (with or without nutrients). By increasing the viscosity (slightly thickening the water to a mild gelatin-like substance), the circulation of water throughout the plant slightly coagulates and slows. This slows the uptake of this moisture by the plant. It also slows the transpiration (moisture emitted from leaf surface) of the plant. By doing so, the moisture in the plant vessel 1200 lasts longer, as the plant is using it more slowly.

While not all varieties need the use of a thickening agent, or agar-agar, it may be included for most plants at various concentrations depending upon the desired shelf life and expected environmental conditions likely to be experienced during distribution and subsequent display. To illustrate, a single lettuce plant and variety in a six-ounce plant vessel 1200 may contain four-five ounces of hydration. In this example, one-two parts agar-agar to 99-98 parts water (respectively), is beneficial for maintaining long term vibrancy of the lettuce. A person of ordinary skill in the art may further optimize the concentration and water content relative to the substrate 1214 depending on the plant variety and intended use.

Figure 13:
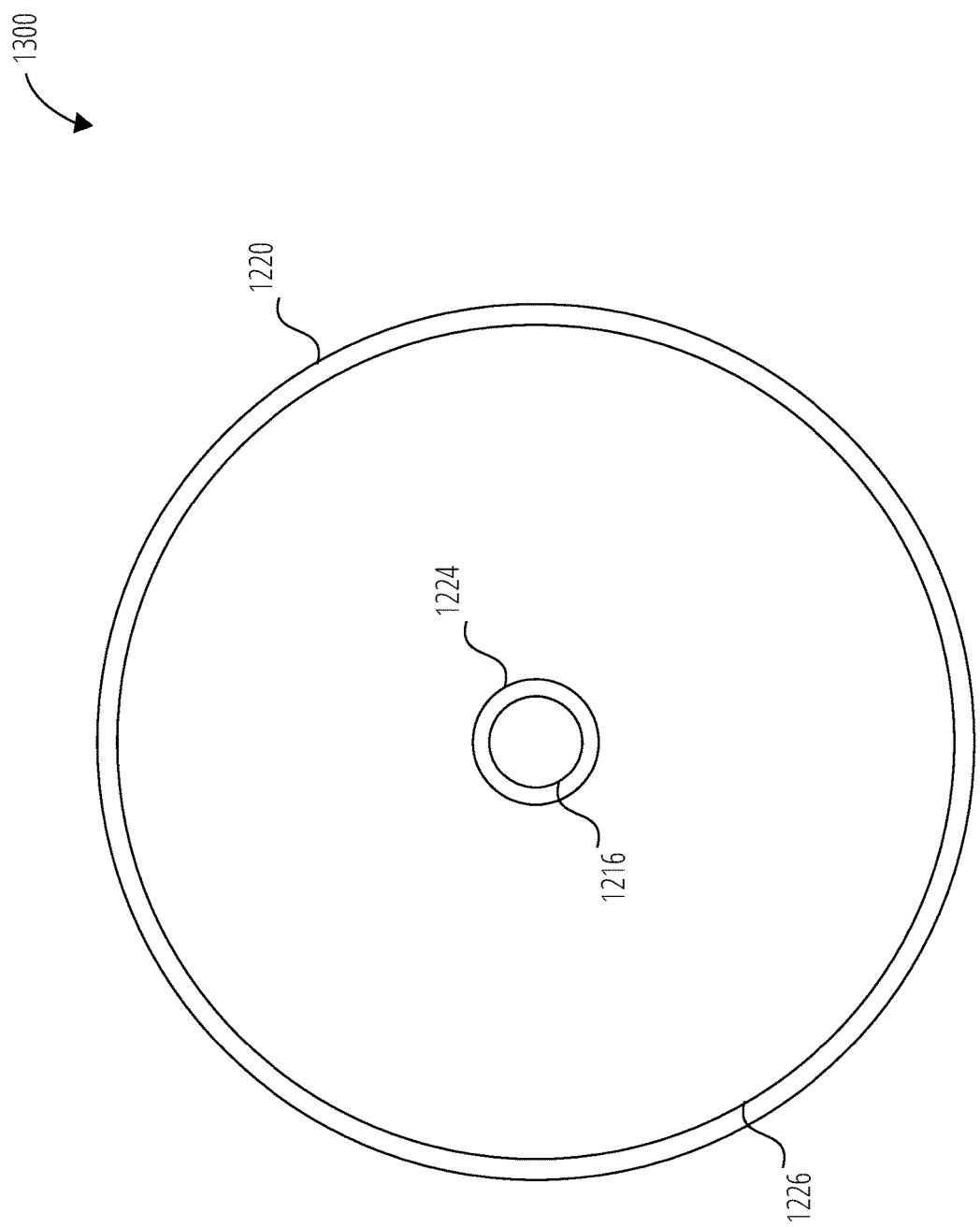
FIG. 13 illustrates a plant vessel top view 1300 in accordance with one embodiment.

Referring to FIG. 13, the plant vessel top view 1300, illustrating the top view of the plant vessel 1200 as shown in FIG. 12. As shown, the circular cover 1220 fits over the smaller but also circular top rim 1226, forming a seal to encase the nutrients in the uppermost stratified layer of the impervious outer vessel. At the center of both the cover 1220 an underlying top rim 1226, a seed pocket 1224 forms a circular cutout in the center of both the top rim 1226 and cover 1220. At the base of the seed pocket 1224, an aperture 1216 provides an opening through which a growing plant forms a seal preventing the nutrients in the nutrient chamber from harming the seedlings or shoots of plants growing up through the seed pocket 1224.

Figure 14:
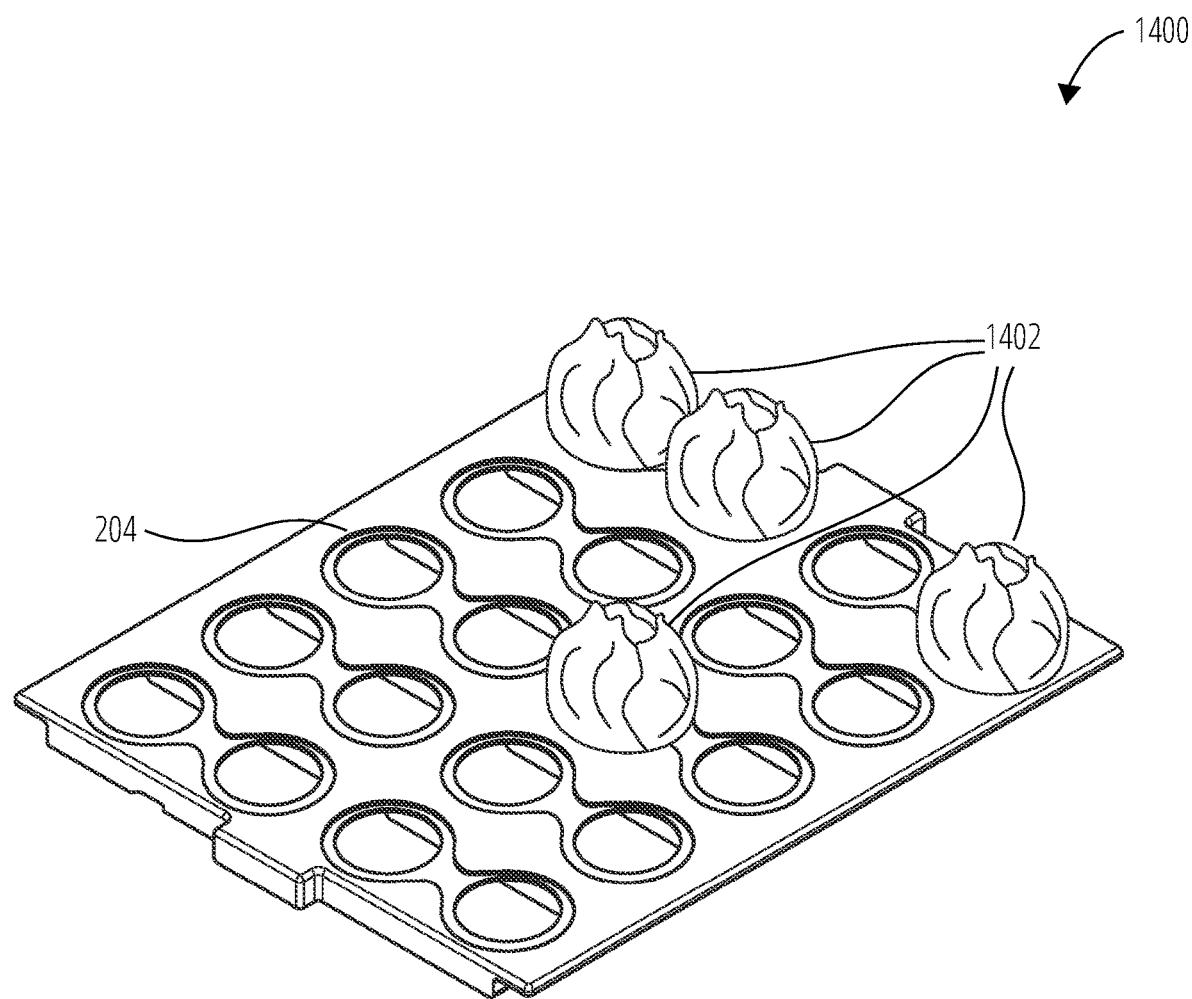
FIG. 14 illustrates a grow rack 1400 in accordance with one embodiment.

Referring to FIG. 14, a grow rack 1400 is described. "Grow rack" in this disclosure refers to a physical shelf, containing a plurality of plants in plant vessels. The grow rack may include means of illumination and temperature control to serve the controlled cultivation of plants. "Plant vessel" in this disclosure refers to a container designed to facilitate individual plant growth. The plant vessel may include an outer membrane, an impervious outer vessel, a cover, a substrate, a nutrient chamber, a pervious membrane, and a root zone. "Impervious outer vessel" in this disclosure refers to a plant vessel including vertically oriented walls and a base. The impervious outer vessel may also include a cover, and a top rim.

A grow rack 1400 containing plants 1402, for the purposes of this disclosure, may be considered synonymous with a growing tray 204 containing said plants 1402. As shown, the grow rack contains a plurality of plants 1402, and/or shoots of plants in various stages of development. As described above, the growing tray 204 may be made of a non-reactive material of sufficient tension strength to simultaneously hold a variable number of plants 1402. In an embodiment, each growing tray 204 may be die cut with at least two overlapping sizes to accommodate insertion of the plant vessels and the locking into place of said plant vessels in the growing tray 204. The process of locking each plant vessel into a secure place in a die cut of the growing tray 204 may be done manually or automatically according to a means known to those skilled in the art for placing plant vessels in a grow rack. The number of plant vessels in each grow rack at any given time may vary according to the growth conditions of individual plants 1402, and/or shoots of plants and may be additionally confirmed by visual imagery recorded by at least one camera on the fertigation system.

Figure 15:
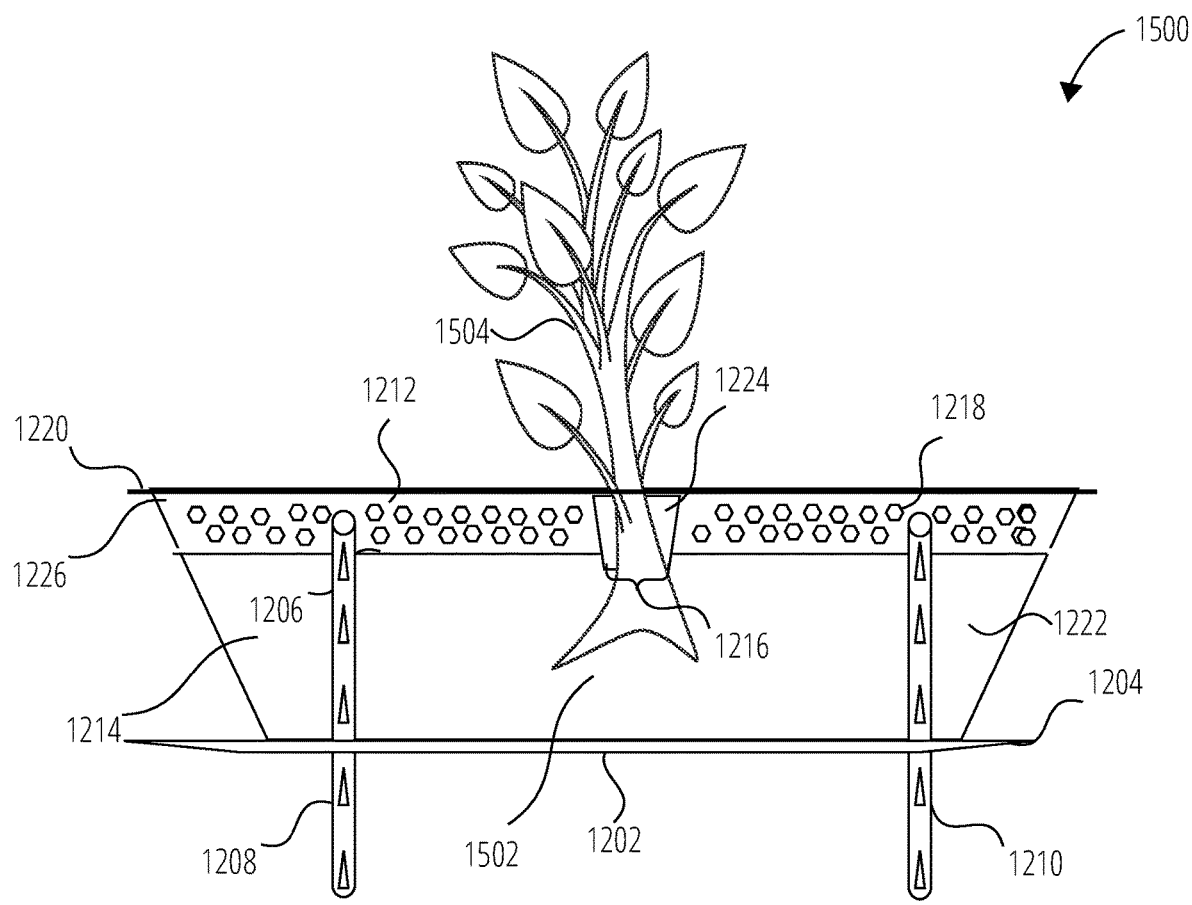
FIG. 15 illustrates a plant vessel with shoots 1500 in accordance with one embodiment.

Referring to FIG. 15, a plant vessel with shoots 1500 is illustrated showing a plant having matured to the point of sending out shoots and establishing roots in a root zone 1502 within the substrate 1214. "Substrate" in this disclosure refers to a biologically and chemically unreactive material that a plant may grow in or on. "Root zone" in this disclosure refers to the area of oxygen and soil (substrate) surrounding the roots of a plant.

As shown, the impervious outer vessel 1202 retains its component parts as previously illustrated in FIG. 12, namely the base 1204, cover 1220, top rim 1226, vertically oriented walls 1222, seed pocket 1224, and aperture 1216. Inside the impervious outer vessel 1202, the upper nutrient chamber 1212 and lower substrate 1214 are separated by a pervious membrane 1206 and a plurality of nozzles such as raw water nozzle 1208 and raw water nozzle 1208 penetrate the impervious outer vessel 1202 base 1204 to feed water to the nutrient chamber 1212, the substrate 1214, or some combination of the two during the fertigation process.

Having germinated and grown, a plant as manifested by a shoot or shoots of plants 1504 extends through the aperture 1216 and seed pocket 1224, sending roots through a root zone 1502 in the substrate 1214. To prevent the shoots of plants 1504 from being damaged by direct contact with the nutrients 1218, a seal is formed at the aperture 1216 when the plant itself pushes through the aperture 1216 into the seed pocket 1224 and further extends its growth above the impervious outer vessel 1202.

The methods, apparatuses, and systems in this disclosure are described in the preceding on the basis of several preferred embodiments. Different aspects of different variants are considered to be described in combination with each other such that all combinations that upon reading by a skilled person in the field on the basis of this document may be regarded as being read within the concept of the disclosure. The preferred embodiments do not limit the extent of protection of this document.

Having thus described embodiments of the present disclosure of the present application in detail and by reference to illustrative embodiments thereof, it will be apparent that modifications and variations are possible without departing from the scope of the present disclosure.

What is claimed is:

1. A method of growing plants, seeds or seedlings, comprising:
   using a fertigation system to extract a growing tray comprising plant vessels from a grow module,
   the fertigation system including:
      a tray movement system for extracting the growing tray from the grow module and placing the growing tray back into the grow module;
      a tray elevator for lowering and raising the growing tray;
      a first pump in fluid communication with at least one of a fresh water supply and a nutrient/water mixture; and
      a nozzle manifold in fluid communication with at least one of the first pump, the fresh water supply, and the nutrient/water mixture,
      the nozzle manifold comprising:
         a manifold header; and
         at least one nozzle in fluid communication with the manifold header, wherein the at least one nozzle is configured to inject at least one of the fresh water supply and the nutrient/water mixture supplied by the first pump into plant vessels on the growing tray,
         the plant vessels including:
         plants, seeds or seedlings; and
         a substrate in a root zone;
   moving the growing tray toward the at least one nozzle or moving the at least one nozzle toward the growing tray;
   injecting at least one of the fresh water supply and the nutrient/water mixture into the root zone;
   removing the at least one nozzle from the plant vessel; and
   placing the growing tray back into the grow module.

2. The method of claim 1, wherein the fertigation system further includes at least one camera, the method further comprising:
   capturing video or images of plants in the plurality of plant vessels using the at least one camera.

3. The method of claim 1, wherein the fertigation system further comprises:

a mixing tank configured to contain the nutrient/water mixture, wherein the mixing tank is in fluid communication with the fresh water supply and a nutrient supply;

a second pump in fluid communication with the mixing tank;

a day tank in fluid communication with the first pump and the second pump; and fluid communication between the nozzle manifold and pressurized air.

4. The method of claim 3, further comprising:

injecting the pressurized air into the root zone using the at least one nozzle, the pressurized air injected comprising at least one of highly concentrated oxygen, highly concentrated ozone, and highly concentrated nitrogen, and combinations thereof; and controlling at least one of the tray movement system, the tray elevator, the first pump, the second pump, and the at least one nozzle, using a control system.

5. The plant fertigation system of claim 1, wherein the plant vessels further comprise:

an impervious outer vessel including the substrate in the root zone;

a cover over the impervious outer vessel;

a pervious membrane in contact with the substrate;

a nutrient chamber including nutrients, wherein the nutrient chamber is between the cover and the pervious membrane, and the nutrients are in contact with the pervious membrane; and a pocket allowing a seed or seedling access to the substrate through an aperture in the cover and the pervious membrane.

6. The plant fertigation system of claim 5, wherein the at least one nozzle punctures the impervious outer vessel and the pervious membrane of the plant vessels without puncturing the cover on the plant vessels.

7. The plant fertigation system of claim 5, wherein water is injected by the at least one nozzle into the root zone, the at least one nozzle is inserted through the impervious outer vessel and through the pervious membrane, and the pervious membrane controls the amount of the water and the nutrients entering the substrate based on its permeability.

8. A plant fertigation system comprising:

a tray movement system for extracting a growing tray from a grow module and placing the growing tray back into the grow module;

a tray elevator for lowering and raising the growing tray;

a first pump in fluid communication with at least one of a fresh water supply and a nutrient/water mixture; and a nozzle manifold in fluid communication with at least one of the first pump, the fresh water supply, and the nutrient/water mixture, the nozzle manifold comprising:

a manifold header; and an at least one nozzle in fluid communication with the manifold header, wherein the at least one nozzle is configured to inject at least one of the fresh water supply and the nutrient/water mixture supplied by the first pump into plant vessels on the growing tray, the plant vessels including:

plants, seeds or seedlings; and a substrate in a root zone.

9. The plant fertigation system of claim 8, further comprising at least one camera.

10. The plant fertigation system of claim 8, further comprising:

a mixing tank configured to contain the nutrient/water mixture, wherein the mixing tank is in fluid communication with the fresh water supply and a nutrient supply and is configured with an opening for accepting non-liquid additives in the mixing tank;

a second pump in fluid communication with the mixing tank;

a day tank in fluid communication with the first pump and the second pump; and fluid communication between the nozzle manifold and pressurized air.

11. The plant fertigation system of claim 10, further comprising a control system to control at least one of the tray movement system, the tray elevator, the first pump, and the second pump.

12. The plant fertigation system of claim 8, wherein the plant vessels further comprise:

an impervious outer vessel including the substrate in the root zone;

a cover over the impervious outer vessel;

a pervious membrane in contact with the substrate;

a nutrient chamber including nutrients, wherein the nutrient chamber is between the cover and the pervious membrane, and the nutrients are in contact with the pervious membrane; and a pocket allowing a seed or seedling access to the substrate through an aperture in the cover and the pervious membrane.

13. The plant fertigation system of claim 12, wherein the at least one nozzle punctures the impervious outer vessel and the pervious membrane of the plant vessels without puncturing the cover on the plant vessels.

14. The plant fertigation system of claim 12, wherein water is injected by the at least one nozzle into the root zone, the at least one nozzle is inserted through the impervious outer vessel and through the pervious membrane, and the pervious membrane controls the amount of the water and the nutrients entering the substrate based on its permeability.

15. A plant growing system comprising:

a plurality of plant vessels, the plant vessels including:

plants, seeds or seedlings; and a substrate in a root zone;

a growing tray configured to hold the plurality of the plant vessels; and a fertigation system comprising:

a tray movement system for extracting the growing tray from a grow module and placing the growing tray back into the grow module;

a tray elevator for lowering and raising the growing tray;

a first pump in fluid communication with at least one of a fresh water supply and a nutrient/water mixture; and a nozzle manifold in fluid communication with at least one of the first pump, the fresh water supply, and the nutrient/water mixture, the nozzle manifold comprising:

a manifold header; and an at least one nozzle in fluid communication with the manifold header, wherein the at least one nozzle is configured to inject at least one of the fresh water supply and the nutrient/water mixture supplied by the first pump into plant vessels on the growing tray.

16. The plant growing system of claim 15, wherein the fertigation system further comprises at least one camera.

17. The plant growing system of claim 15, the fertigation system further comprising at least one of:
- a mixing tank configured to contain the nutrient/water mixture, wherein the mixing tank is in fluid communication with the fresh water supply and a nutrient supply and is configured with an opening for accepting non-liquid additives in the mixing tank;
- a second pump in fluid communication with the mixing tank;
- a day tank in fluid communication with the first pump and the second pump; and
- fluid communication between the nozzle manifold and pressurized air.

18. The plant growing system of claim 17, further comprising a control system to control at least one of the tray movement system, the tray elevator, the first pump, and the second pump.

19. The plant growing system of claim 15, the plurality of plant vessels further comprising:
- an impervious outer vessel including the substrate in the root zone;
- a cover over the impervious outer vessel;
- a pervious membrane in contact with the substrate;
- a nutrient chamber including nutrients, wherein the nutrient chamber is between the cover and the pervious membrane, and the nutrients are in contact with the pervious membrane; and
- a pocket allowing a seed or seedling access to the substrate through an aperture in the cover and the pervious membrane.

20. The plant growing system of claim 19, wherein the at least one nozzle punctures the impervious outer vessel and the pervious membrane of the plant vessels without puncturing the cover.

* * * * *